United States Patent [19]

Muramatsu et al.

[11] Patent Number: 5,008,698

[45] Date of Patent: Apr. 16, 1991

[54] CONTROL APPARATUS FOR IMAGE SENSOR

[75] Inventors: Sadao Muramatsu; Yukifumi Hashiba; Yuuichi Ikeda, all of Tokyo, Japan

[73] Assignee: Kyocera Corporation, Kyoto, Japan

[21] Appl. No.: 248,983

[22] Filed: Sep. 26, 1988

[30] Foreign Application Priority Data

| Sep. 28, 1987 | [JP] | Japan | 62-240878 |
| Oct. 16, 1987 | [JP] | Japan | 62-259494 |
| Dec. 29, 1987 | [JP] | Japan | 62-333729 |
| Feb. 26, 1988 | [JP] | Japan | 63-42126 |
| Mar. 28, 1988 | [JP] | Japan | 63-72004 |

[51] Int. Cl.$^5$ .............. G03B 13/36; G03B 7/08
[52] U.S. Cl. .................. 354/429; 354/432; 354/402
[58] Field of Search ........... 354/400, 402, 406, 408, 354/429, 432

[56] References Cited

U.S. PATENT DOCUMENTS

| 4,410,258 | 10/1983 | Aoki et al. | 354/406 |
| 4,643,557 | 2/1987 | Ishizaki et al. | 354/406 |
| 4,660,955 | 4/1987 | Ishida et al. | 354/402 |
| 4,719,486 | 1/1988 | Hosino et al. | 354/408 |

Primary Examiner—Russell E. Adams
Attorney, Agent, or Firm—Spensley Horn Jubas & Lubitz

[57] ABSTRACT

A control system for an image sensor that has an array of pixels and a fetching circuit. During a charge accumulation interval each pixel generates a corresponding instantaneous pixel signal cumulatively responsive to the light the pixel has received from an incident image. At the end of the accumulation interval, the fetching circuit composes an image signal from the values attained by the array's various instantaneous pixel signals. The control system has a drive control circuit and a contrast detector. The contrast detector is coupled to the array for deriving an instantaneous image contrast signal from the instantaneous pixel signals. The drive control circuit then uses the instantaneous image contrast signal for adjusting the array's accumulation interval so the image signal will have good contrast.

21 Claims, 17 Drawing Sheets

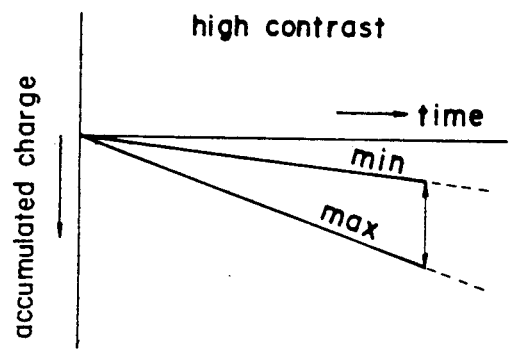
FIG. 5A low brightness high contrast
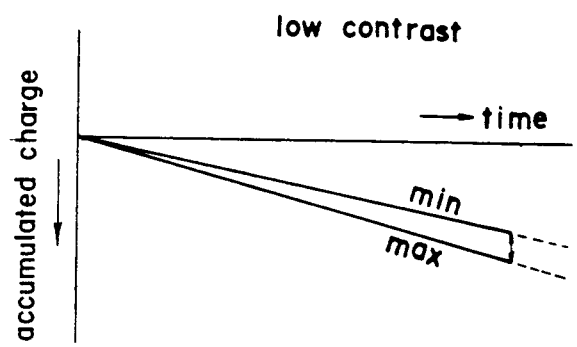
FIG. 5B low brightness low contrast
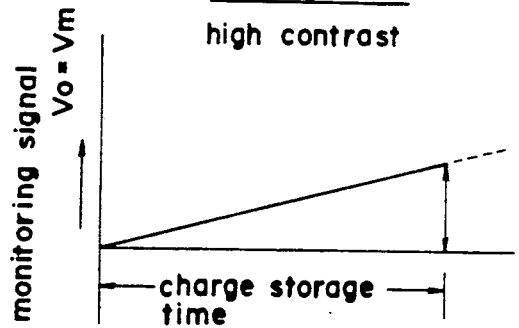
FIG. 5C low brightness high contrast
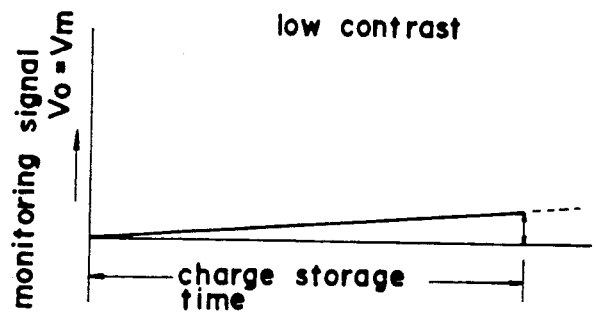
FIG. 5D low brightness low contrast

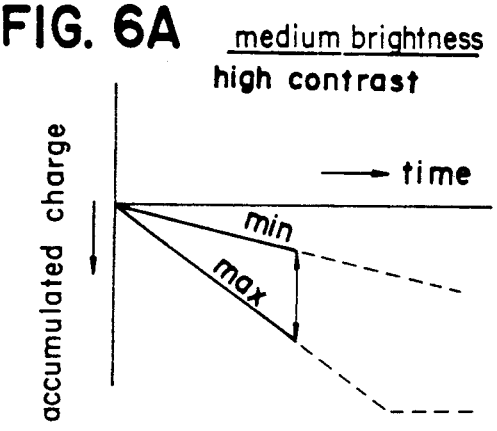
FIG. 6A  medium brightness high contrast
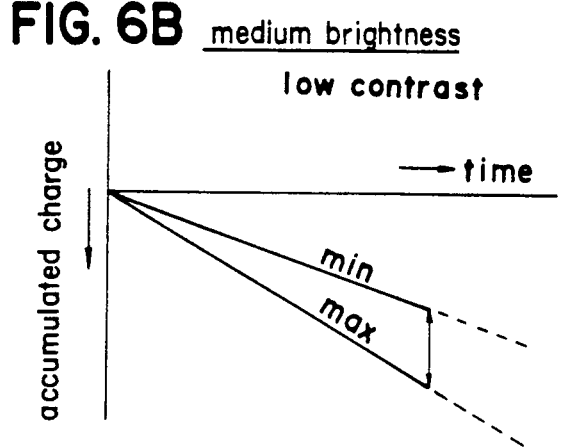
FIG. 6B  medium brightness low contrast
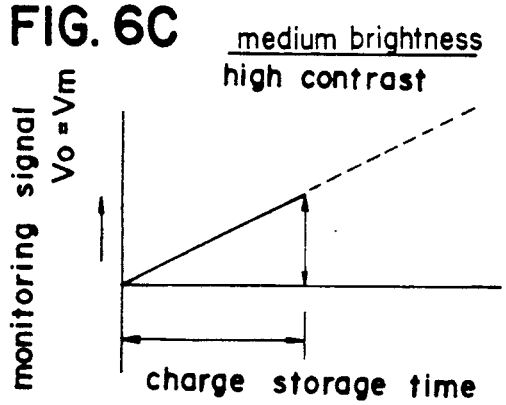
FIG. 6C  medium brightness high contrast
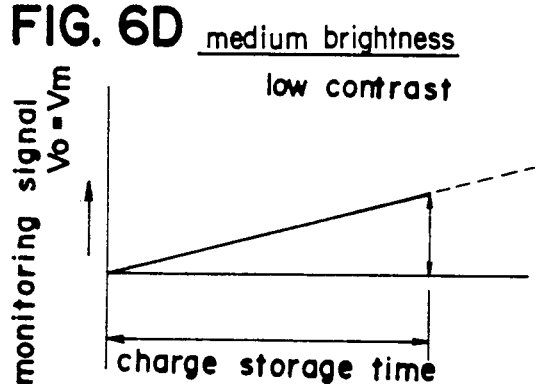
FIG. 6D  medium brightness low contrast

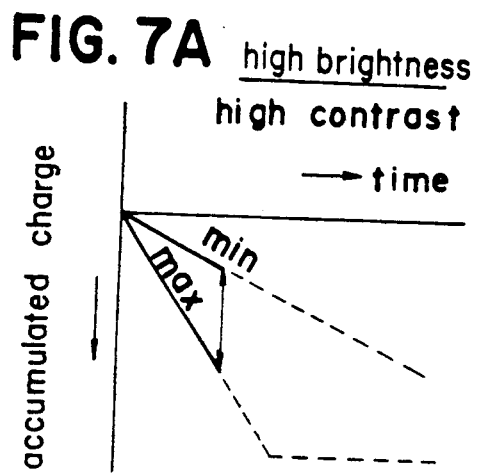
FIG. 7A high brightness high contrast
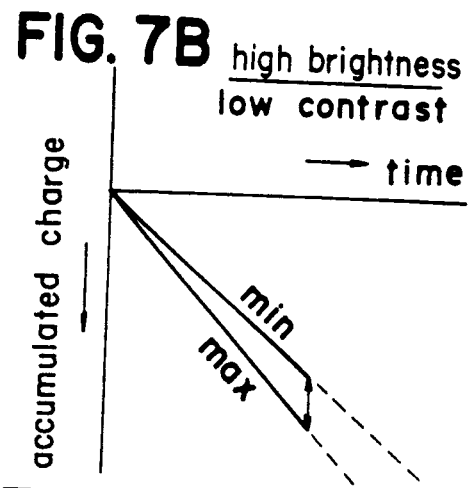
FIG. 7B high brightness low contrast
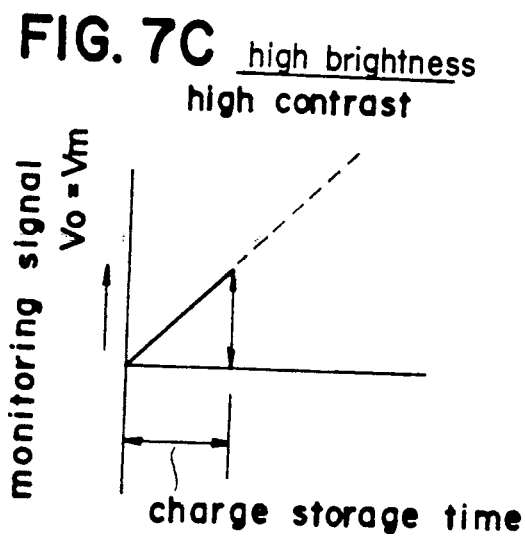
FIG. 7C high brightness high contrast
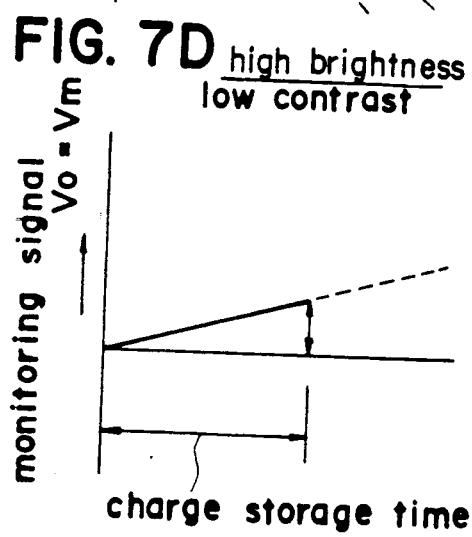
FIG. 7D high brightness low contrast FIG. 15A    $Ti > Ts + To$
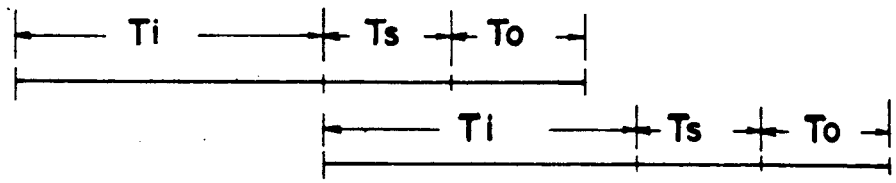
FIG. 15B    $Ts + To > Ti > To$
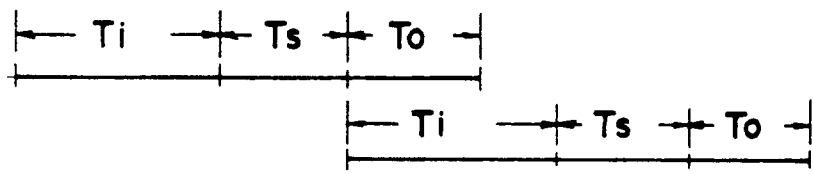
FIG. 15C    $Ti < To$
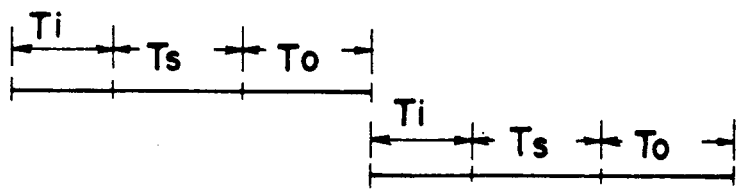
FIG. 15D
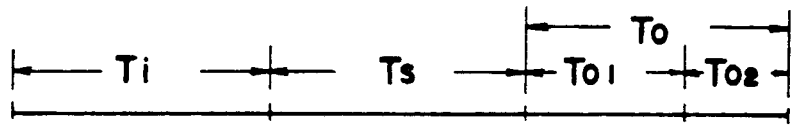

FIG. 19A  low brightness
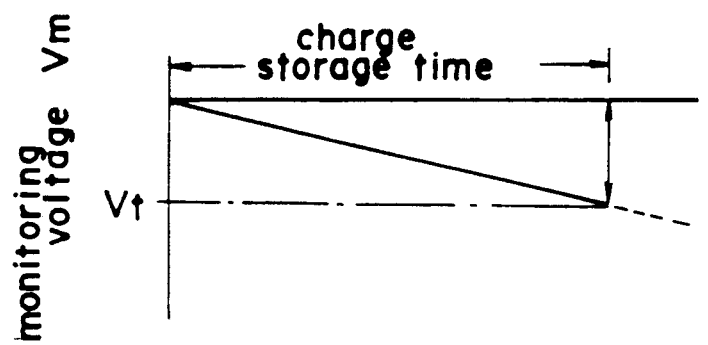
FIG. 19B  medium brightness
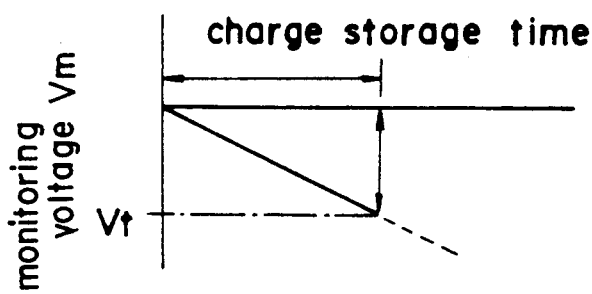
FIG. 19C  high brightness
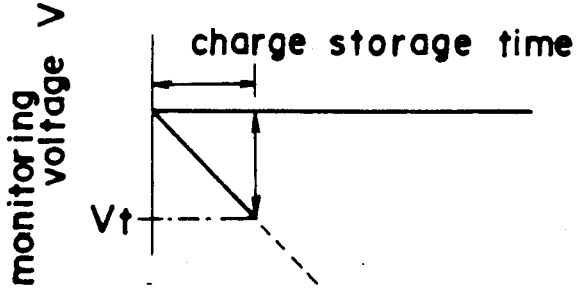

photoelectric pixel series of sensor array

CONTROL APPARATUS FOR IMAGE SENSOR

The present invention relates to a control apparatus for an image sensor particularly useful in a focus detection apparatus in a camera, such as in a camera's autofocus system.

BACKGROUND

Typical autofocus cameras recently available in the market are so arranged that the light from an object to be photographed falls upon an image sensor and focus detection is performed on the basis of an image data signal (i.e., image pickup signal) output from the image sensor.

Many autofocus cameras use a charge-coupled-device (CCD) element or metal-oxide-semiconductor (MOS) sensor as the image sensor and, in general, employ a so-called "phase difference detecting mode" in which the object to be photographed is imaged both on a primary area and a reference area of the image sensor. Then the image on the reference area is brought into proper correlation with the image on the primary area to effect the desired focus detection. Other autofocus cameras employ a so-called contrast detecting mode which utilizes the fact that the object imaged on the image sensor exhibits the highest contrast ratio when brought into focus.

FIG. 17 is a block diagram illustrating an example of a prior art image sensor. It consists of a CCD element which is well known, comprising a multi-pixel image sensor array 11 having a primary image area and a reference image area, a reset gate 12, a shift gate 13, and a CCD shift register 14. A brightness monitoring sensor 15 disposed adjacent the image sensor causes its associated amplifier 16 to output a brightness monitoring voltage $V_m$ which is used to regulate the charge accumulation or storage time of image sensor array 11.

More specifically, as shown in FIGS. 18A and 18B and FIGS. 19A–19C, in response to a reset pulse $\phi_r$ input to the reset gate 12 of sensor array 11 and the circuit associated with monitoring sensor 15, an amplifier 16 begins-outputting a falling brightness monitoring voltage $V_m$, the slope of which is determined by the brightness of the light incident on monitoring sensor 15. The pixels of image sensor array 11 accumulate negative charge in response to the image illumination intensity for a charge accumulation time interval which ends when brightness monitoring voltage $V_m$ falls to a preset voltage level $V_t$.

In response to a shift pulse $\phi_s$, the amount of charge thus stored in array 11 is transferred in parallel to the CCD shift register 14. Then, in response to transfer clock pulses $\phi_1$, $\phi_2$, the charges stored in the shift register 14 are successively serially transferred to a preamplifier 17 which, in turn, outputs a corresponding image data signal voltage $V_{os}$.

This image data signal voltage $V_{os}$ is compared to a compensation voltage $V_{cs}$ output from a reference amplifier 18 identical to amplifier 17, and a signal ($V_{os}-V_{cs}$) representing the difference of these voltages is digitalized by an analog-to-digital (A/D) converter (not shown) and then applied to a digital signal processing circuit (not shown) for distance calculations.

In this arrangement of the prior art, the monitoring sensor 15 monitors only an average brightness of the illumination distributed on the primary area of the image sensor array 11. Accordingly, as shown in FIG. 20, when an image of a high contrast ratio is projected onto the sensor array 11, or relatively intense light is incident upon some pixels locally, the brightest pixels become saturated as time increases as is shown happening in charge amount curve A. Because the saturated pixels distort curve A, an accurate image data signal voltage $V_{os}$ cannot be obtained, and an error inevitably appears in the resulting distance calculations used for focusing.

To avoid such saturation with high contrast images, it might be contemplated to set the preset voltage level $V_t$ in FIGS. 18A and 18B for the monitoring voltage $V_m$ to a level corresponding to a shorter charge accumulation time for image sensor array 11. However, this would have the disadvantage of decreasing the amount of charge accumulation when detecting an object of a low contrast ratio and reducing the signal-to-noise (S/N) ratio of the image data signal voltage $V_{os}$. Moreover, a level of $V_t$ sufficiently far from the saturation region would limit the amount of stored charge, causing the image sensor to be inefficiently used at a disadvantageously low S/N ratio.

Furthermore, the prior art brightness monitoring sensor 15 is never exposed to exactly the same light from the object to be photographed, or a portion thereof, as the light incident on the image sensor itself. Therefore, it is sometimes impossible to properly control the amount of accumulated charge, depending upon the particular objects to be photographed.

As shown FIG. 18B, when the image of an object projected onto the sensor array 11 is of a low contrast ratio, the signal fluctuation—($V_{max}-V_{min}$) of the image data signal voltage $V_{os}$ is substantially smaller than the fluctuation in the difference voltage—(-$V_{os}-V_{cs}$) between the image data signal voltage $V_{os}$ and the compensation voltage $V_{cs}$. Therefore, if the signal to be digitalized for data processing is ($V_{os}-V_{cs}$), and A/D converter of relatively high resolution must be employed to accurately convert the information-bearing ripples in image signal $V_{os}$.

As will be apparent from FIGS. 18A and 18B, and FIGS. 19A–19C, the charge accumulation time of the image sensor array 11 is set to the time elapsing from when the reset pulse $\phi_r$ is input to the time at which the monitoring voltage $V_m$ (corresponding to an average output signal) reaches the preset voltage level $V_t$. Thus, the average of the difference voltage—($V_{os}-V_{cs}$) is kept constant and such difference voltage is input to the A/D converter after amplification.

In the special case when the brightness of the object to be photographed is so low that the brightness monitoring voltage $V_m$ does not reach the preset voltage $V_t$ within a specified time limit, the difference signal voltage—($V_{os}-V_{cs}$) for the image is amplified by an amount determined by the level reached by the average brightness monitoring voltage $V_m$. In such case also, no effective A/D conversion can be achieved for an object of low contrast ratio, since the degree of amplification depends on the average of said difference voltage—(-$V_{os}-V_{cs}$) rather than the range of image signal fluctuation $V_{min}-V_{max}$.

SUMMARY OF THE INVENTION

Accordingly, a first object of the present invention is to regulate a charge accumulation time for an image sensor based on the contrast of the light incident on the image sensor array of the image sensor, rather than based on the average brightness of the light distributed on a primary area of the image sensor array as in the above prior art.

The present invention achieves this first object by providing an improved control apparatus for an image sensor such as CCD element, comprising light detector means adapted to derive the maximum and minimum light detection signals from the respective amounts of accumulated charge at the pixels which receive the most intense and the weakest components of the whole image incident upon said image sensor. The control apparatus also includes control means adapted to regulate a charge accumulation time of the image sensor based on a contrast signal representing the difference between the maximum and minimum light detection signals.

A second object of the present invention is to very accurately determine the contrast of the light incident upon the image sensor array. The present invention achieves this by providing a control apparatus for an image sensor such as a CCD element, comprising light detector means adapted to derive the maximum and minimum light detection signals from respective amounts of accumulated charge at the pixels upon which the most intense and weakest components of the whole image are incident upon said image sensor. The control apparatus also includes differential amplifier means to which the maximum and minimum light detection signals are input and from which a contrast signal representing their difference is output. The apparatus also has control means adapted to adjust the degree of amplification or gain of the differential amplifier means based on the contrast signal, and then to regulate the charge accumulation time of the image sensor based on the contrast signal output from the differential amplifier means.

A third object is to achieve the highest possible repetition efficiency for charge accumulation of successive images in the image sensor. This is achieved by an improved control apparatus for an image sensor, such as a CCD element. The control apparatus has control means adapted to initiate a following charge accumulation just after the preceding charge accumulation time $T_i$ has elapsed if a relationship of $T_i > T_s + T_o$ is established among a charge accumulation time $T_i$ of the image sensor, an image data signal fetching time $T_s$ for fetching an image data signal from the image sensor's shift register, and an operational processing time $T_o$ needed to data process the image data signal. But if $T_s + T_o > T_i > T_o$, then the control means initiates the following charge accumulation after the fetching time $T_s$ for the preceding charge accumulation has elapsed. However, if $T_i < T_o$, then the control means only initiates the following charge accumulation after the preceding operational processing time $T_o$ has elapsed.

A fourth object of the present invention is to stop further charge accumulation of the image sensor should the charge storage approach saturation. This is achieved by providing a control apparatus for an image sensor such as CCD element, comprising light detector means adapted to derive the maximum and minimum light detection signals from respective amounts of accumulated charge at the pixels which receive the most intense and weakest components of the whole light incident upon said image sensor. The control apparatus also has first stopping control means adapted to stop the charge accumulation of the image sensor based on a signal representing the difference between the maximum and minimum light detection signals, and second stopping control means responsive to the maximum light detection signal approaching saturation to stop the further charge accumulation of the image sensor prior to the first stopping control means.

Moreover, if the time at which the charge accumulation is stopped by the second stopping control means is during a period of the preceding image data signal fetching or operational processing of this data signal, an initiation control means of the control apparatus will cause the image sensor to rapidly clear out the newly accumulated charge, and then, after the preceding operational processing time has elapsed, initiate a new charge accumulation.

A fifth object of the present invention is to improve the precision with which an image data signal output from the image sensor can be data processed. This is achieved by providing a control apparatus for an image sensor, comprising light detector means adapted to derive the minimum light detection signal from the amount of accumulated charge at the pixel receiving the weakest component of the whole light incident upon said image sensor, and signal output means adapted to derive a signal representing the difference between an image data signal fetched from the image sensor and the minimum light detection signal, thereby generating an output signal for data processing.

These and other objects and advantages of the invention will be described in detail below with reference to the drawings.

BRIEF DESCRIPTION OF THE DRAWINGS

FIGS. 5A, 5B, 5C, 5D, 6A, 6B, 6C, 6D, 7A, 7B, 7C, and 7D are diagrams illustrating, respectively for low, medium, and high brightness, the charge accumulation amounts in the pixels of the sensor array having the minimum and maximum brightness, and their corresponding contrast monitoring signals.

FIGS. 15A–15D and FIGS. 16A and 16B are diagrams illustrating the time at which a subsequent charge accumulation is initiated under various conditions.

FIGS. 19A–19C are a diagram illustrating a brightness monitoring voltage $V_m$ as a function of time for various brightness levels.

DETAILED DESCRIPTION

1. General Construction

Now several embodiments of the present invention will be described with reference to the accompanying drawings.

Figure 1:
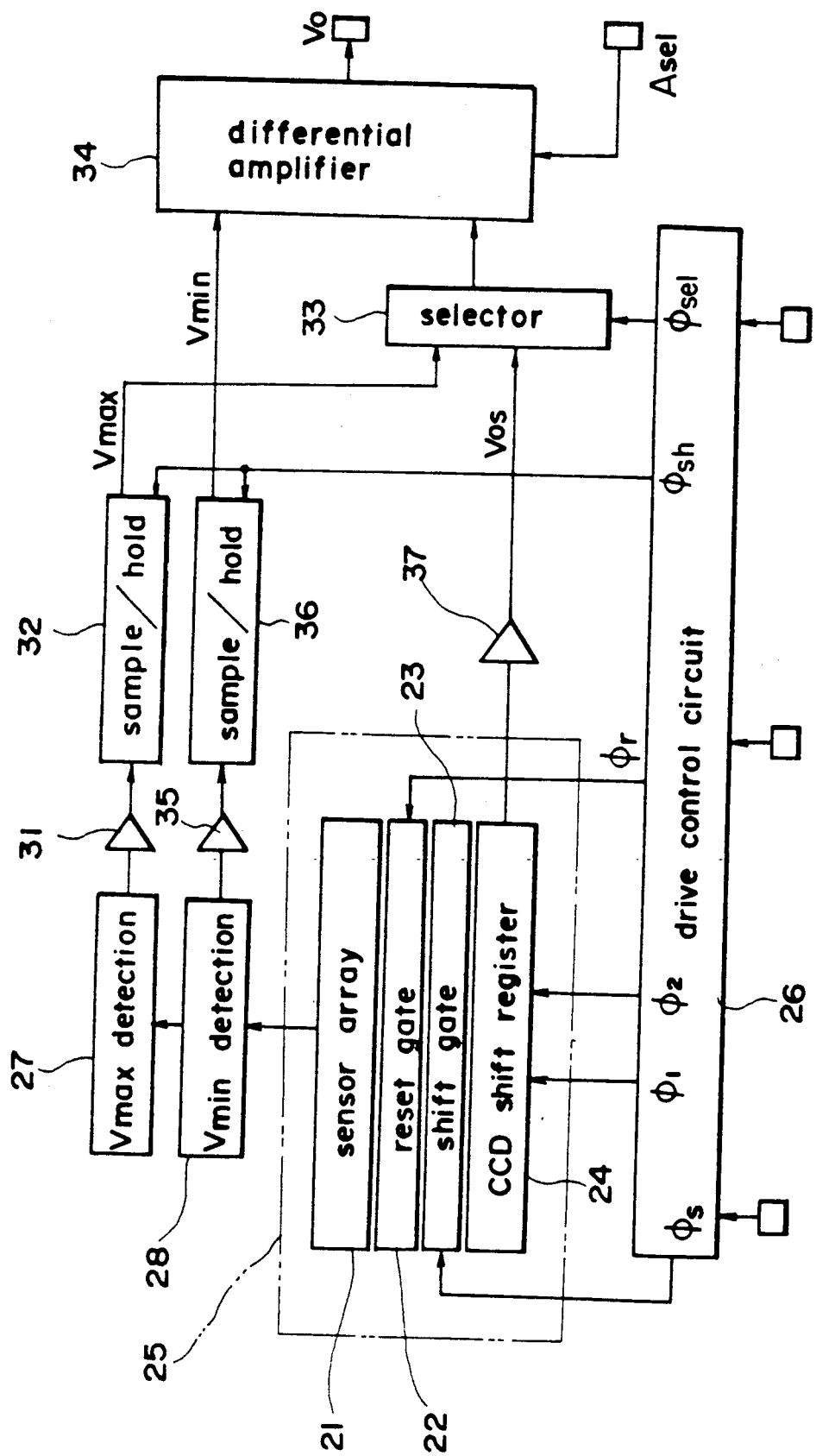
FIG. 1 is block diagram illustrating an embodiment of a control apparatus constructed according to the invention in which a differential amplifier for monitoring serves also as an amplifier for an image data signal.

FIG. 1 shows a block diagram of a novel control apparatus adapted for use with an image sensor for focus detection. As in the prior art, an image sensor array 21, a reset gate 22, a shift gate 23, and a CCD shift register 24 together form an image sensor 25. As has already been described, image sensor 25 is responsive to a reset pulse $\phi_r$, a shift pulse $\phi_s$, and transfer clock pulses $\phi_1$, $\phi_2$, input from a drive control circuit 26 to output an image data signal $V_{os}$.

The image sensor 25 is provided with a maximum light detector circuit 27 adapted to detect the charge accumulation amount at the pixel receiving the most intense component of the light-incident upon the sensor array 21. A minimum light detector circuit 28 is adapted to detect the charge accumulation amount at the pixel receiving the weakest component of the incident light. The maximum and minimum values of the charge accumulation amounts on the sensor array 21 generally increase with time, as shown by FIGS. 5A and 5B, 6A and 6B, and 7A and 7B and these changing maximum and minimum values are respectively detected by detector circuits 27 and 28.

Figure 4:
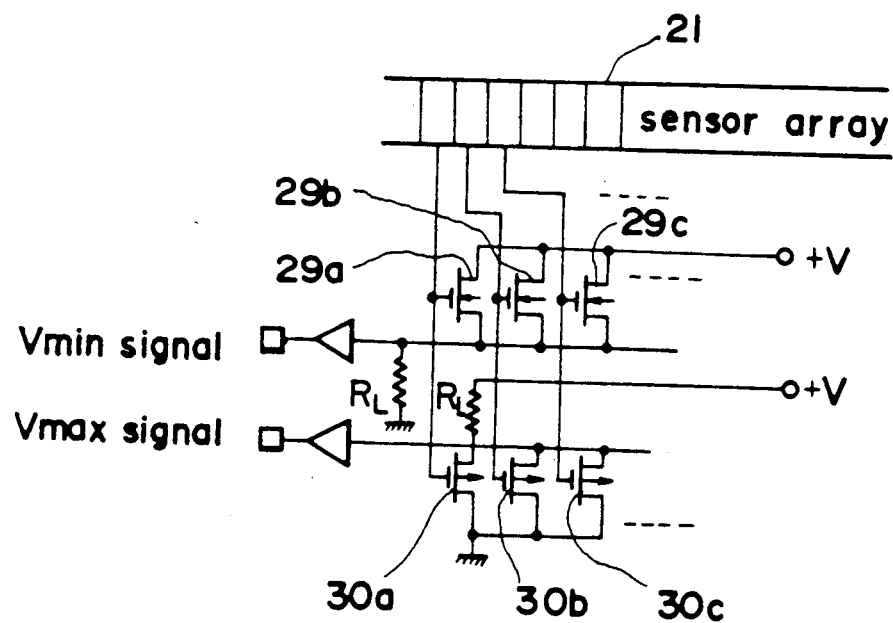
FIG. 4 is a illustrates a detector circuit for the maximum light detection signal and a detector circuit for the minimum light detection signal.

FIG. 4 is a circuit diagram illustrating specific examples of these detector circuits 27, 28. To find the pixel of array 21 receiving the least light, detector 28 includes N-channel MOS type field effect transistors (FETs) 29a, 29b, 29c . . . . These have their gates connected to respective pixels of the sensor array 21, their sources connected via a common load resistor $R_L$ to ground, and their drains attached to a positive supply voltage $+V$. They function as source followers to fetch the voltages of the pixels which indicate their accumulated charges. The resulting output is a $V_{min}$ signal (highest voltage) corresponding to the voltage of the pixel receiving the minimum light component. To find the pixel with the maximum light, detector 27 includes P-channel MOS type FETs 30a, 30b, 30c . . . . These have their gates connected to respective pixels, their sources connected via a common load resistor $R_L$ to a positive supply voltage $+V$, and their drains attached to ground. They also function as source followers to output a resulting $V_{max}$ signal (lowest voltage) corresponding to the maximum light component.

As shown in FIG. 1, the $V_{max}$ signal detected by maximum light detector circuit 27 is applied through an amplifier 31 to a sample and hold (sample/hold) circuit 32. Then the $V_{max}$ signal as sampled or held by circuit 32 is input to a selector circuit 33, whose selected output is applied to a differential amplifier 34.

Similarly, the $V_{min}$ signal detected by minimum light detector circuit 28 is applied through an amplifier 35 to another sample/hold circuit 36, the sampled or held $V_{min}$ signal being applied to the other input of differential amplifier 34.

The sample/hold circuits 32, 36 are controlled by a sample/hold signal $\phi_{sh}$ applied from the drive control circuit 26 to switch from sample-state to hold-state.

Selector circuit 33 comprises an analog switch responsive to a selector signal $\phi_{sel}$ being HIGH to select the $V_{max}$ signal as one input for differential amplifier 34. However, when selector signal $\phi_{sel}$ is LOW, the analog switch instead selects the image data signal $V_{os}$ (applied via an amplifier 37 from the CCD shift register 24) as input for differential amplifier 34.

For the monitoring operation, $\phi_{sh}$ switches both sample/hold circuits 32 and 36 to the sampling mode and $\phi_{sel}$ switches selector circuit 33 to select the $V_{max}$ signal for differential amplifier 33. Thus, when charge accumulation of sensor array 21 is initiated, the maximum light detection signal ($V_{max}$ signal) and the minimum light detection signal ($V_{min}$ signal) are detected by the respective detector circuits 27, 28 from the corresponding pixels of sensor array 21. The difference between the $V_{max}$ and $V_{min}$ signals depends upon the contrast of the light incident from the object to be photographed.

The $V_{max}$ signal is sampled by sample/hold circuit 32 and applied through selector circuit 33 to one input of the differential amplifier 34. Similarly, the $V_{min}$ signal is sampled by sample/hold circuit 36 and applied to the other input of differential amplifier 34. The differential amplifier 34 then provides an output signal $V_o$ equal to $-A_m(V_{max}-V_{min})$, where $A_m$ designates the degree of amplification or gain of amplifier 34.

The output signal $V_o$ (representing the contrast) is applied to an operational processing circuit (e.g. a microcomputer, not shown in FIG. 1) and, after suitable A/D conversion, operationally processed thereby. The operational processing circuit provides a gain control (or amplification degree selection) signal $A_{sel}$ to differential amplifier 34. Signal $A_{sel}$ depends on the value of the output signal $V_o$ (i.e., difference signal) operationally processed by the operational processing circuit. As a result, the gain $A_s$ of amplifier 34 is newly selected so that the gain is in inverse proportion to the magnitude of the output signal as previously amplified. More specifically, the amplitude of the output signal $V_o$ is adjusted so that even if relatively small initially, after the adjustment it is sufficiently amplified to assure its good A/D conversion.

In this manner, the image contrast in sensor array 21 can be evaluated by monitoring the difference signal of $V_{max}$ and $V_{min}$ as reflected in the value $V_o$ subjected to operational processing. The operational processing circuit next controls the drive control circuit 26 to output the shift pulse $\phi_s$. In response to $\phi_s$, the accumulated charge is transferred from sensor array 21 to CCD shift register 24. At this moment of transfer, any further charge accumulation of the sensor array 21 is stopped.

After the drive control circuit 26 has monitored the stored image in the manner described above, both sample/hold circuits 32, 36 are switched by $\phi_{sh}$ to the hold mode and selector circuit 33 is controlled by $\phi_{sel}$ to select image data signal $V_{os}$ for input to amplifier 34. In such a state, the transfer clock pulses $\phi_1$, $\phi_2$ are output to read out shift register 24.

The differential amplifier 34 is thus supplied with the image data signal $V_{os}$ from the CCD shift register 24 at one input and the held $V_{min}$ signal at the other input. Amplifier 34 provides $V_o = -A_s(V_{os} - V_{min})$ as its output signal to the operational processing circuit, which operationally processes $V_o$ for distance calculations.

In this embodiment, switching selector circuit 33 enables a single differential amplifier 34 to be used both for monitoring of difference signal ($V_{max} - V_{min}$) and for amplifying image data signal ($V_{os} - V_{min}$). However, as shown by FIG. 2, if desired, instead a differential amplifier 38 exclusively for monitoring $V_{max} - V_{min}$ and another differential amplifier 39 exclusively for amplifying $V_{os} - V_{min}$ can be provided.

Figure 2:
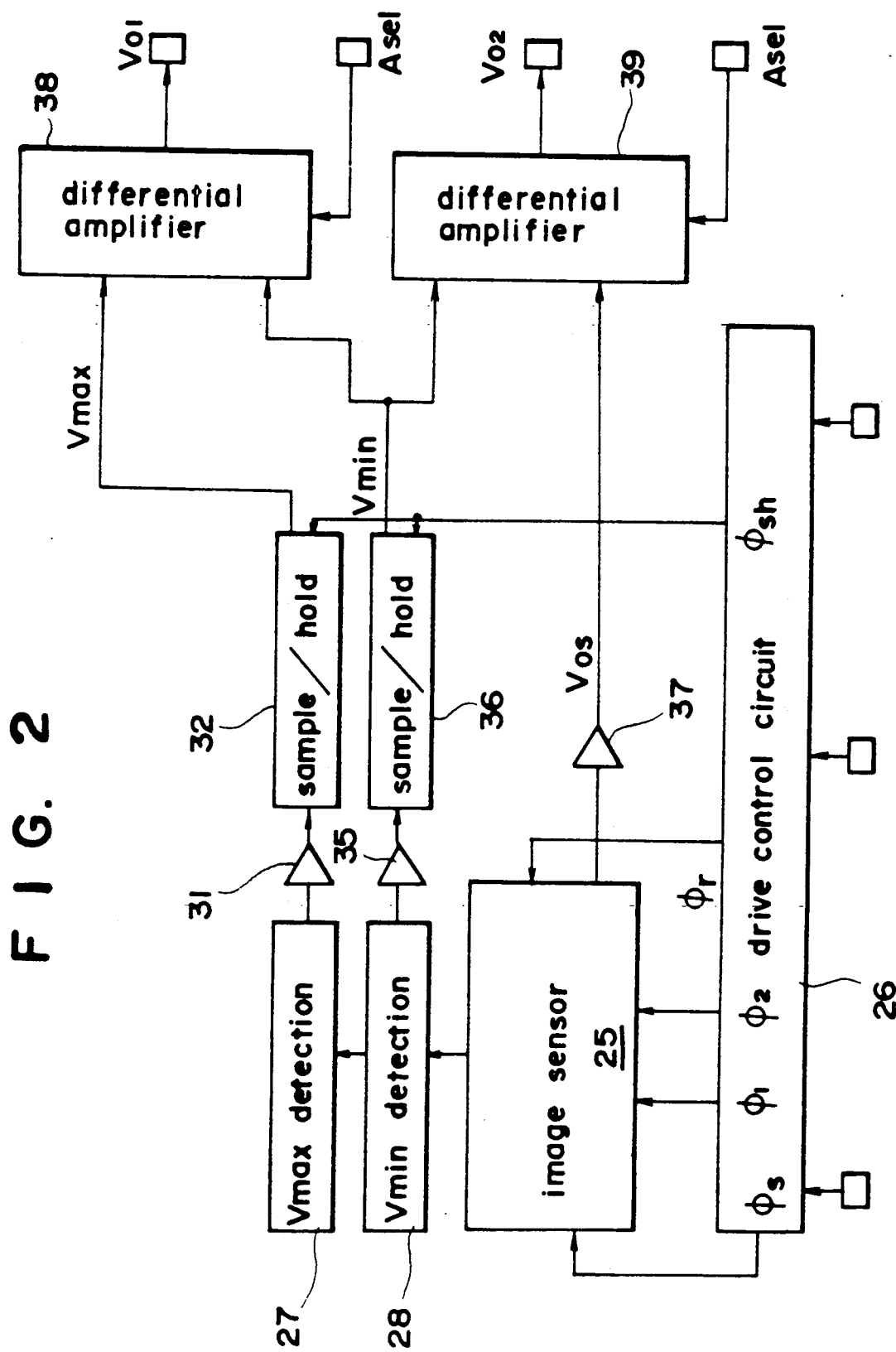
FIG. 2 is a block diagram illustrating another embodiment of the control apparatus constructed according to the present invention in which the differential amplifier for monitoring and the differential amplifier for the image data signal are separately provided.

In FIG. 2, an output signal $V_{o1}$, of the differential amplifier 38 is operationally processed to obtain the gain selection signal $A_{sel}$ which is then applied to both the differential amplifiers 38 and 39 for adjustment to a new amplification gain $A_s$. Thus, the differential amplifier 38 provides an output signal $V_{o1} = -A_s(V_{max} - V_{min})$ and the differential amplifier 39 provides an output signal $V_{o2} = -A_s(V_{os} - V_{min})$.

Figure 3:
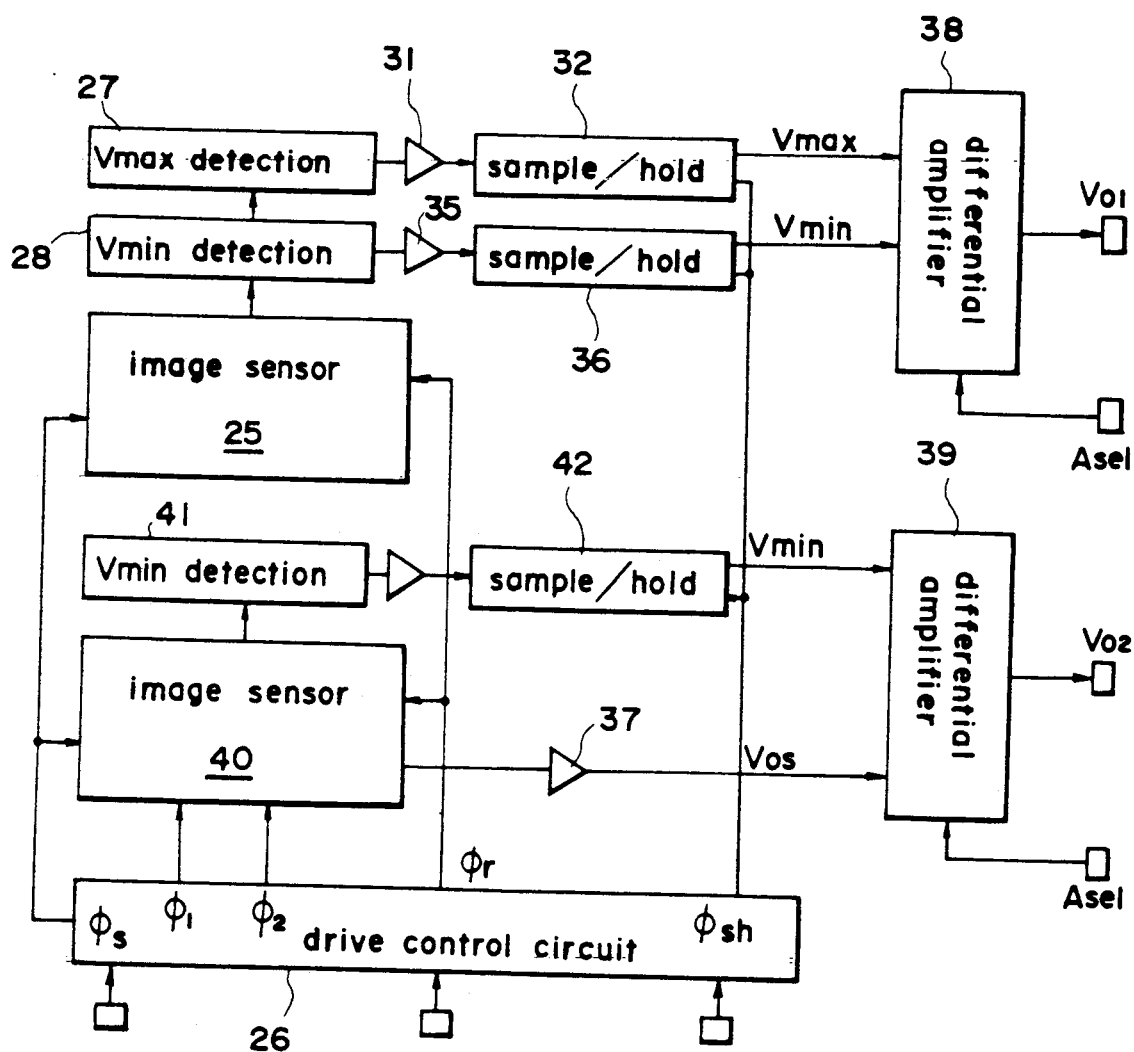
FIG. 3 is a block diagram illustrating still another embodiment of the control apparatus constructed according to the present invention in which an image sensor for monitoring and an image sensor for providing the image data signal are separately provided.

FIG. 3 illustrates another embodiment in which a first image sensor 25 is used exclusively for contrast monitoring. The $V_{max}$ and $V_{min}$ signals are amplified by the differential amplifier 38, and a second image sensor 40 is used exclusively for supplying of the image data signal $V_{os}$ to one input of differential amplifier 39. Image sensor 40 is provided with a minimum light detector circuit 41 which outputs a $V_{min}$ signal sampled and held by a sample/hold circuit 42 and then applied to the other input of the differential amplifier 39. In this embodiment, if desired the CCD image sensor 25 may be replaced by a simpler type of light receiving sensor, such as a photodiode array.

Figure 8:
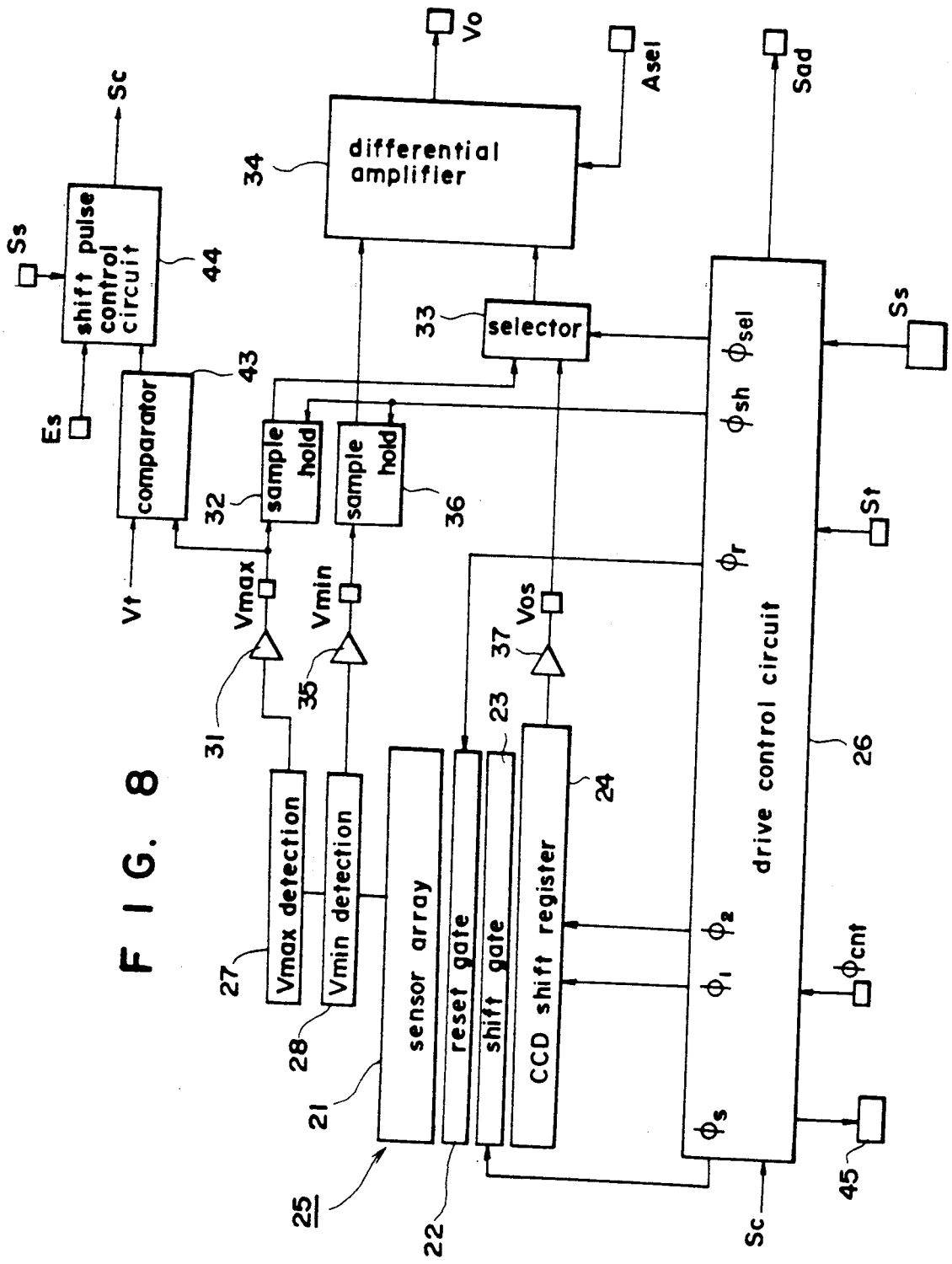
FIG. 8 is a block diagram illustrating the control apparatus of the invention in detail.

FIG. 8 illustrates another embodiment of the control apparatus, similar to the embodiment of FIG. 1 but additionally provided with a comparator 43 and a shift pulse control circuit 44. Comparator 43 compares the $V_{max}$ signal with a preset reference or saturation threshold voltage $V_t$ so as to invert when the $V_{max}$ of the charge accumulation amounts of sensor array 21 approaches saturation.

More particularly, if the object to be photographed is relatively bright and the most intense portion further increases, the charge accumulation amount of the corresponding pixel of the sensor array 21 approaches saturation, and the $V_{max}$ signal corresponding to said most intense component of the incident light causes comparator 43 to invert. For example, saturation threshold $V_t$ can be set so that when the $V_{max}$ signal reaches 80% of the saturation level of sensor array 21, comparator 43 inverts. The inverted output of comparator 43 is applied to a shift pulse control circuit 44.

Shift pulse control circuit 44 switches state upon receiving a LOW shift selection signal $S_s$ so that the inverted output of the comparator 43 can be input thereto. When signal $S_s$ is HIGH, the inverted output is prevented from being input thereto, and instead an externally provided shift signal $E_s$ is input thereto.

In response to said inverted output from comparator 43 or the shift signal $E_s$, shift pulse control circuit 44 outputs a corresponding shift control signal $S_c$ to drive control circuit 26.

Shift signal $E_s$ is provided by a microcomputer as will be described in more in detail later. After the step where the gain of differential amplifier 34 is set by the monitoring operation based on the contrast of the object to be photographed, the inverted output from comparator 43 is prevented from being applied to shift pulse control circuit 44 so long as control circuit 44 is switched to output shift control signal $S_c$ in response to shift signal $E_s$. In such state, drive control circuit 26 receives signal $S_c$ and shapes it into a suitable shift pulse which is output to the shift gate 23.

During the monitoring operation, shift pulse control circuit 44 will sometimes be supplied with the inverted output from comparator 43 before the gain of the differential amplifier 34 is set based on the contrast. In such case circuit 44 responds by supplying shift control signal $S_c$ in the same manner as in the previously mentioned case, and then control circuit 26 applies a shift pulse $\phi_s$ to the shift gate 23 in the manner previously mentioned. Input of shift control signal $S_c$ to the drive control circuit is monitored by a shift monitoring circuit 45 in such a manner that monitoring of the contrast cannot begin again until sensor array 21 starts the next charge accumulation.

Figure 9:
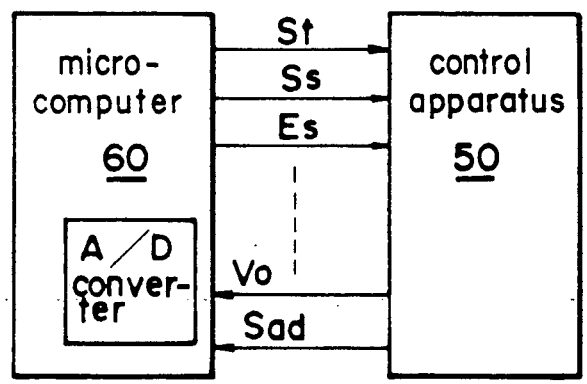
FIG. 9 is a block diagram illustrating the signal communication between the control apparatus of the invention and a microcomputer.

As shown in FIG. 9, the control apparatus (block 50) for the image sensor 25 is in signal communication with a microcomputer 60. In addition to the already mentioned shift selection signal $S_s$, shift signal $E_s$, and gain selection signal $A_{sel}$, microcomputer 60 applies a start signal $S_t$ and a transfer control signal $\phi_{cnt}$ to control apparatus 50. Start signal $S_t$ instructs image sensor array 21 to start a new charge accumulation, and transfer control signal $\phi_{cnt}$ controls the CCD shift register 24 to be driven at a high speed. More specifically, signal fetching from this shift register 24 is normally performed at a speed limited by the time needed to A/D convert the resulting signal $V_o$ output by differential amplifier 34. When no image data signal $V_{os}$ is necessary, however, shift register 24 is driven at a high speed to clear out unwanted accumulated charge.

Microcomputer 60 receives output signal $V_o$ from differential amplifier 34 and an A/D timing signal $S_{ad}$ from drive control circuit 26. During contrast monitoring output signal $V_o$ is expressed by $-A_m(V_{max} - V_{min})$, and when supplied with the image signal $V_{os}$ from sensor 25 the output signal $V_o$ is expressed by $-A_s(V_{os} - V_{min})$. The A/D timing signal $S_{ad}$ serves to coordinate timing of CCD shift register 24 and an A/D converter included in microcomputer 60, signaling when the output signal $V_o$ of differential amplifier 34 is stable and can be A/D converted.

Now, the operation of the image sensor control apparatus described above will be explained with reference to the time chart of FIG. 10.

2. Setting Amplifier Gain By Contrast Monitoring

When start signal $S_t$ goes HIGH, drive control circuit 26 outputs reset signal $\phi_r$ in the form of LOW voltage, causing sensor array 21 to start a new charge accumulation. When start signal $S_t$ is HIGH and shift selection signal $S_s$ is LOW, circuit 26 outputs both the sample/hold signal $\phi_{sh}$ and the select signal $\phi_{sel}$ in the form of HIGH voltage.

The HIGH sample/hold signal $\phi_{sh}$ causes both sample/hold circuits 32, 36 to be maintained in the sampling mode, and the HIGH select signal $\phi_{sel}$ switches selector circuit 33 to select the $V_{max}$ signal for contrast monitoring. At the same time, in response to the LOW shift selection signal $S_s$, shift pulse control circuit 44 is enabled to receive any inverted output from comparator 43.

Microcomputer 60 supplies differential amplifier 34 with a gain selection signal $A_{sel}$ by which said differential amplifier 34 is set to a predetermined gain $A_m$ based on the particular circuit arrangement.

In this contrast monitoring state, as the charge accumulation of the sensor array 21 progresses, the $V_{max}$ signal detected by the maximum light detector circuit 27 and the $V_{min}$ signal detected by the minimum light detector circuit 28 are respectively sampled by circuits 32, 36 and applied to differential amplifier 34.

Accordingly, differential amplifier 34 provides a contrast monitoring output signal $V_o = V_m$ expressed by $$V_m = -A_m(V_{max} - V_{min}) \tag{1}$$

This output signal $V_o = V_m$ is A/D converted and then subjected to data processing by the microcomputer 60. When output signal $V_o = V_m$ is found to have reached or exceeded a predetermined level within a time interval previously specified by the microcomputer 60, the signal $V_o = V_m$ output during the monitoring operation, as illustrated by FIGS. 5C and 5D, 6C and 6D, and 7C and 7D, is operationally processed by the microcomputer 60 to produce a digital output applied to the differential amplifier 34 as a computed gain selection signal $A_{sel}$. Signal $A_{sel}$ determines a new gain $A_s$ of the differential amplifier 34 selected as follows:

$$A_s = (V_f/V_m) \cdot A_m \cdot K \tag{2}$$

where $A_m$ represents, as has ready been defined, the preset gain for the differential brightness of the object image projected onto the sensor array 21, which preset gain depends upon the particular circuit arrangement of the apparatus. $V_f$ represents a full scale of the A/D converter, and K represents a constant which is a safety factor selected in consideration of the differential characteristics of the sensor array 21 exhibited for the monitoring operation and for generation of the image data signal $V_{os}$ as will be discussed. This safety factor is preferably in the order of 0.8.

Suppose under conditions of low image contrast the difference between the maximum and minimum charge accumulation amounts is small, as seen in FIGS. 5B, 6B and 7B, and the processed output signal $V_o = V_m$ of FIGS. 5D, 6D and 7D does not reach the predetermined level within the specified time interval. Then the gain selection signal $A_{sel}$ which determines the gain $A_s$ is adjusted based on the value of output signal $V_o = V_m$ when the specified time interval expires. In this case, the level of the processed output signal $V_o = V_m$ is evaluated and, if A/D conversion of $V_m$ would be inadequate, as seen in FIGS. 5B and 7B, the gain $A_s$ will be adjustingly increased so that the monitoring output signal $V_m$ of the differential amplifier 34 can be A/D converted more accurately.

For example, assuming the gain selection signal $A_{sel}$ is provided as a 3 bit signal, the corresponding gain $A_s$ may be set as listed in Table 1.

TABLE 1

| Asel | As |
|---|---|
| 000 | $4\sqrt{2}$ |
| 001 | 8 |
| 010 | $8\sqrt{2}$ |
| 011 | 16 |
| 101 | 32 |
| 110 | $32\sqrt{2}$ |
| 111 | 64 |

3. Generation of Image Data Signal $V_{os}$

Figure 10:
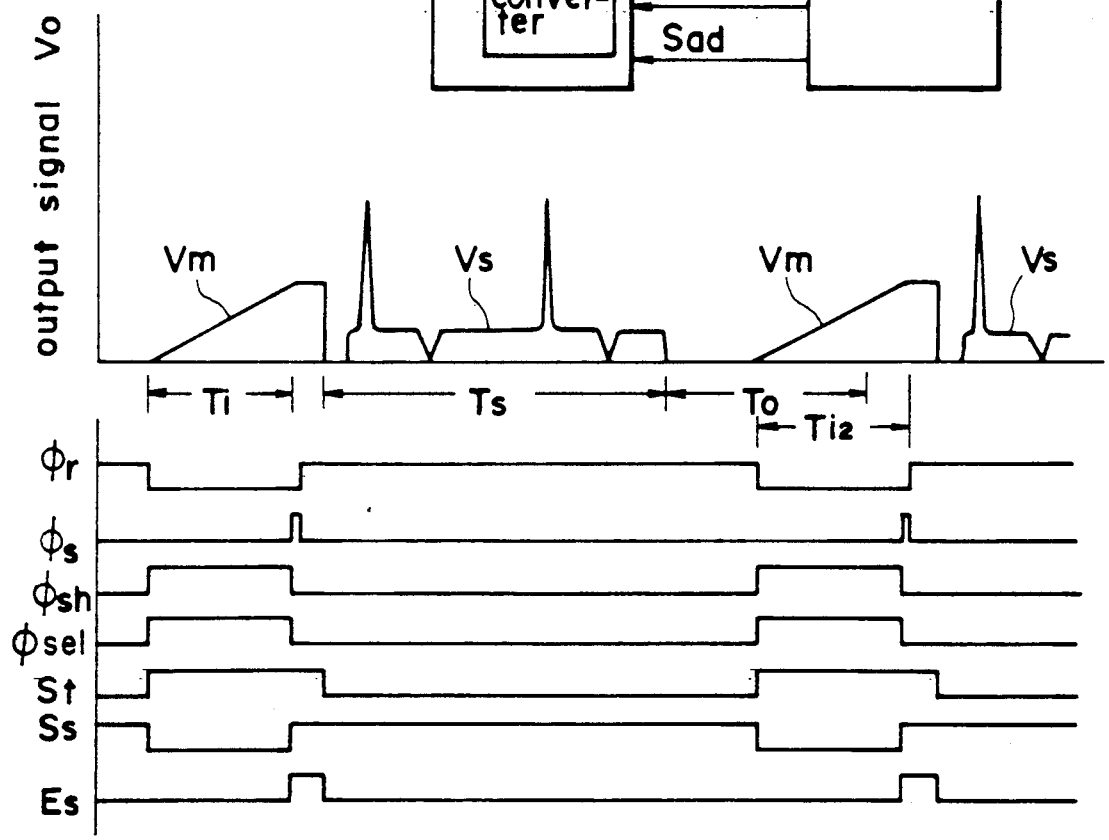
FIG. 10 is a timing chart illustrating the manner in which the control apparatus shown by FIG. 8 operates.

As shown in FIG. 10, after differential amplifier 34 has had its gain adjusted by the contrast monitoring signal corresponding to the output signal $V_o = V_m$, the microcomputer 60 switches shift selection signal $S_s$ from LOW voltage to HIGH voltage. This enables shift pulse control circuit 44 to receive shift signal $E_s$ so that the inverted output of the comparator 43 is prevented from being input to shift pulse control circuit 44 until the monitoring operation occurs again.

As shown in FIG. 10, shift signal $E_s$ is a positive pulse signal supplied from microcomputer 60 after the shift selection signal $S_s$ has been switched from LOW voltage to HIGH voltage. Signal $E_s$ causes shift pulse control circuit 44 to provide the shift control signal $S_c$ to drive control circuit 26. Circuit 26 responds with a shift pulse $\phi_s$ which causes sensor array 21 to transfer its accumulated charge to the CCD shift register 24. When shift pulse $\phi_s$ is input to shift gate 23, reset pulse $\phi_r$ changes from LOW to HIGH voltage, stopping further charge accumulation of the image sensor array 21. In this manner, further charge storage is halted by a first stopping control means.

So charge accumulation of the sensor array 21 is stopped when the control apparatus is supplied with shift signal $E_s$. That is, charge accumulation is stopped when the value of the processed output signal $V_o = V_m$ reaches the predetermined level or the specified time interval elapses. Accordingly, the charge accumulation time depends on $-(V_{max} - V_{min})$. In other words, the higher the contrast, the shorter the charge accumulation time; the lower the contrast, the longer the charge accumulation time.

As seen in FIG. 10, when signal $S_s$ changes from LOW voltage to HIGH voltage, drive control circuit 26 changes select signal $\phi_{sel}$ from HIGH to LOW. The selector circuit 33 switches from its $V_{max}$ signal conducting state to its image data signal $V_{os}$ conducting state. Sample/hold signal $\phi_{sh}$ also switches from HIGH to LOW, to maintain sample/hold circuits 32 and 36 in their holding mode.

After the predetermined time interval has elapsed, microcomputer 60 changes start signal $S_t$ from HIGH to LOW, and at the same time circuit 26 supplies transfer pulses $\phi_1$, $\phi_2$ to CCD shift register 24, causing it to successively provide the image data in a serial mode to generate the image data signal $V_{os}$.

Thus the differential amplifier 34 is supplied with the image data signal $V_{os}$ together with the $V_{min}$ signal held by circuit 36. The output signal $V_o$ of amplifier 34 is expressed by $$V_s = -A_s(V_{os} - V_{min}) \quad (3)$$

This output signal $V_o = V_s$ is successively sent, in synchronization with the transfer pulses $\phi_1$, $\phi_2$, for each pixel to the A/D converter. The A/D converted digital data signal for each pixel is then successively stored in a memory unit (not shown) of the microcomputer.

After the data signal for the all pixels required for the distance calculation has been stored in the memory unit, the gain of amplifier 34 is readjusted to $A_m$ and the previously mentioned monitoring operation is begun afresh.

Referring to FIG. 10, $T_i$ represents a charge accumulation time, $T_s$ represents an image data signal fetching time from the CCD shift register 24, $T_o$ represents an data processing time, and $T_{i2}$ represents a second charge accumulation time.

As will be readily appreciated from the above Formulae (2) and (3), the difference between image data signal $V_{os}$ and the $V_{min}$ signal is amplified with a gain $A_s$ which depends inversely on the contrast indication $V_m$ of the object to be photographed. Accordingly, the smaller the contrast, the larger the gain $A_s$, and conversely, the larger the contrast, the smaller the gain $A_s$. Thus, even for objects of low contrast, output signal $V_s$ is A/D converted with an extremely high precision. For example, when an A/D converter having a full scale of 4 V is used, the $-(V_{os} - V_{min})$ signal will be amplified with a gain of $A_s = 40$ for $(V_{max} - V_{min}) = 100$ mV, and with a gain of $A_s = 8$ for $(V_{max} - V_{min}) = 500$ mV.

Figure 12:
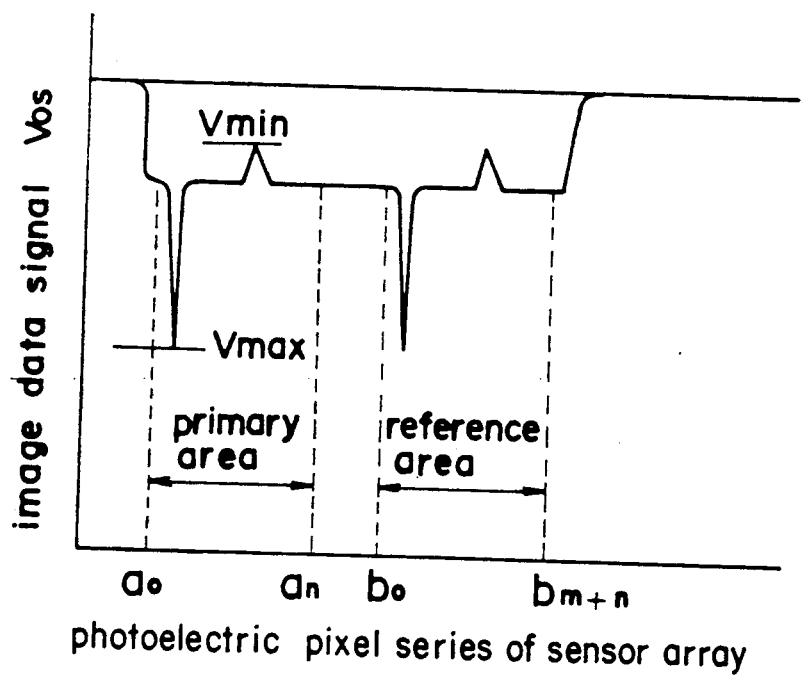
FIG. 12 is a diagram illustrating the image data signal fetched from the CCD shift register of the image sensor as a function of pixel position in the sensor array.

The image data signal $V_{os}$ appears as illustrated by FIG. 12. This image data signal $V_{os}$ is not directly amplified; instead only its net variation, i.e., $-(V_{os} - V_{min})$ is amplified. This enables the signal variation used for focus calculations to be detected with higher precision. For example, suppose an object image signal $V_{os}$ of a contrast ratio $V_{max}:V_{min} = 100:90$ is A/D converted with a resolution of 100 in the conventional manner. Such an A/D converter will merely provide signals in the narrow range 90~100. However, if instead the difference signal $-(V_{os} - V_{min})$ is amplified by 10 and then A/D converted, then digital signals in the full range 0~100 can be provided. In terms of information for focusing, this is equivalent to using an A/D converter having a resolution 10 times as high as the first-mentioned A/D converter.

Although FIG. 12 illustrates the case in which the differential brightness is relatively large, the focus detection of the photographic camera usually presumes a smaller differential brightness.

4. Monitoring Sensor Array Saturation

Figure 11:
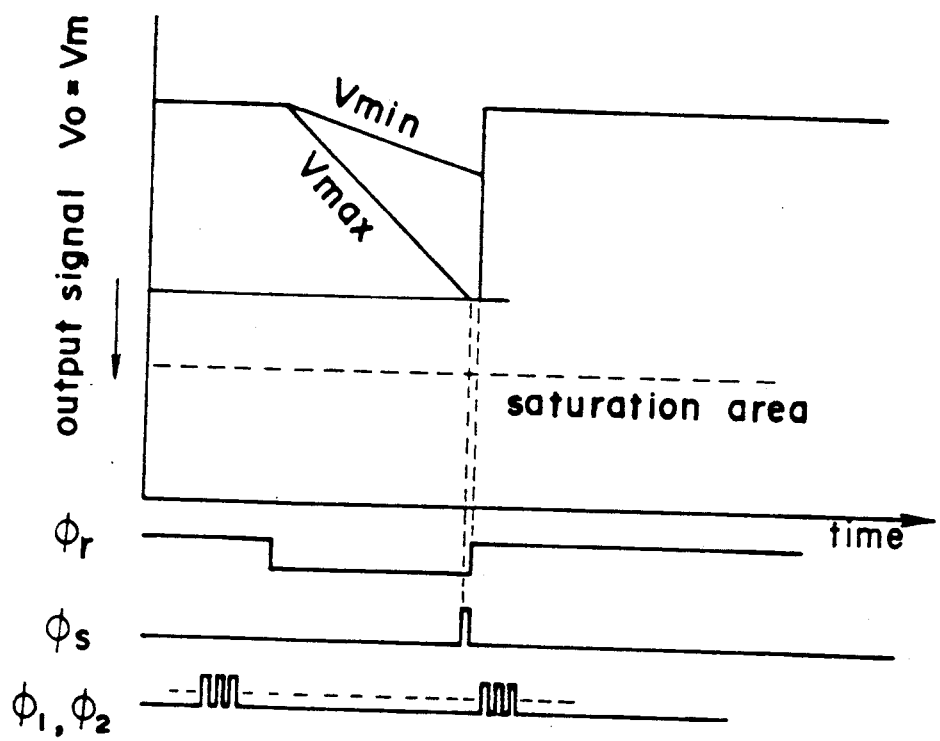
FIG. 11 is a diagram illustrating the charge accumulation of the sensor array as a function of time.

Comparator 43, is used to detect when the charge accumulation of the sensor array 21 approaches its saturation level (see FIG. 11).

As the charge accumulated by sensor array 21 approaches its saturation level for some pixel in response to a bright object to be photographed, compartor 43 is inverted by the $V_{max}$ signal exceeding saturation threshold $V_t$ and, in turn, sends its inverted output to shift pulse control circuit 44. When shift selection signal $S_s$ is LOW, shift pulse control circuit 44 responds to said inverted output of comparator 43 by sending shift control signal $S_c$ to drive control circuit 26. Such state is monitored by shift monitoring circuit 45, and circuit 26 generates a shift pulse $\phi_s$ to transfer the charge accumulated in the sensor array 21 to the CCD shift register 24.

However, at this time, shift selection signal $S_s$ (see FIG. 14, phase $Ph_1$) from microcomputer 60 is still LOW since the output signal $V_o = V_m = -A_m(V_{max} - V_{min})$ from differential amplifier 34 has not reached the predetermined level nor has the specified time interval elapsed. So sample/hold circuits 32, 36 remain in the sampling mode and selector circuit 33 remains in the $V_{max}$ signal selecting mode. Accordingly, the gain selection signal $A_{sel}$ to amplifier 34 is increased so that the processed output signal $V_m$ in Formula (1) can reach the predetermined level. Shift selection signal $S_s$ then switches from LOW to HIGH causing sample/hold circuits 32, 36 to change over to the holding mode and selector circuit 33 to change over to select image data signal $V_{os}$. Differential amplifier 34 then provides the output signal $V_o = V_s$ according to Formula (3).

In this manner the charge accumulation of the sensor array 21 is stopped by the inverted output from comparator 43 to avoid distorting saturation (i.e., stopping by a second stopping control means).

5. Forced Termination of Charge Accumulation Time

Sometimes, for example in poor lighting, the processed output signal $V_o = V_m$ produced as a result of the differential brightness monitoring cannot reach the predetermined level within the specified time nor has $V_{max}$ reached the preset reference or saturation threshold voltage $V_t$ which causes comparator 43 to invert. In this case, microcomputer 60 serves as a timer and can provide, in addition to the first specified time interval, a second extended specified time span longer than the first. The value of the processed output signal $V_o = V_m$ is evaluated at the time the first specified time interval elapses to determine when shift selection signal $S_s$ should be switched to HIGH to enable shift signal $E_s$ (via shift pulse control circuit 44 and drive control circuit 26) to cause the accumulated charge in array 21 to be transferred to CCD shift register 24.

As illustrated by FIGS. 6B and 6D for medium brightness but low contrast, in certain cases no more charge storage time may be needed. For example, if output signal $V_o = V_m$ is higher than a fourth of the predetermined level, depending on the object pattern not only a contrast determination but also a distance calculation may be possible. Or a contrast determination based on the preceding data signal may suggest that a distance calculation is possible even at the current low level of the processed output signal $V_o = V_m$. Or the object image may be moving at too high a speed across sensor array 21 (e.g., during the lens movement) for extension of the charge accumulation time to be useful. In such cases the shift selection signal $S_s$ will be switched to HIGH and shift signal $E_s$ forcibly applied to the shift pulse control circuit 44, leading to generation of shift pulse $\phi_s$. This transfers the charge accumulated in sensor array 21 to CCD shift register 24.

If instead the second, extended specified interval is used, the increase of output signal $V_o = V_m$ enables the contrast to be determined, etc. In any case, the charge accumulation time of the sensor array 21 depends on whether the first or second specified time interval is selected.

6. Flowchart Description

Figure 13:
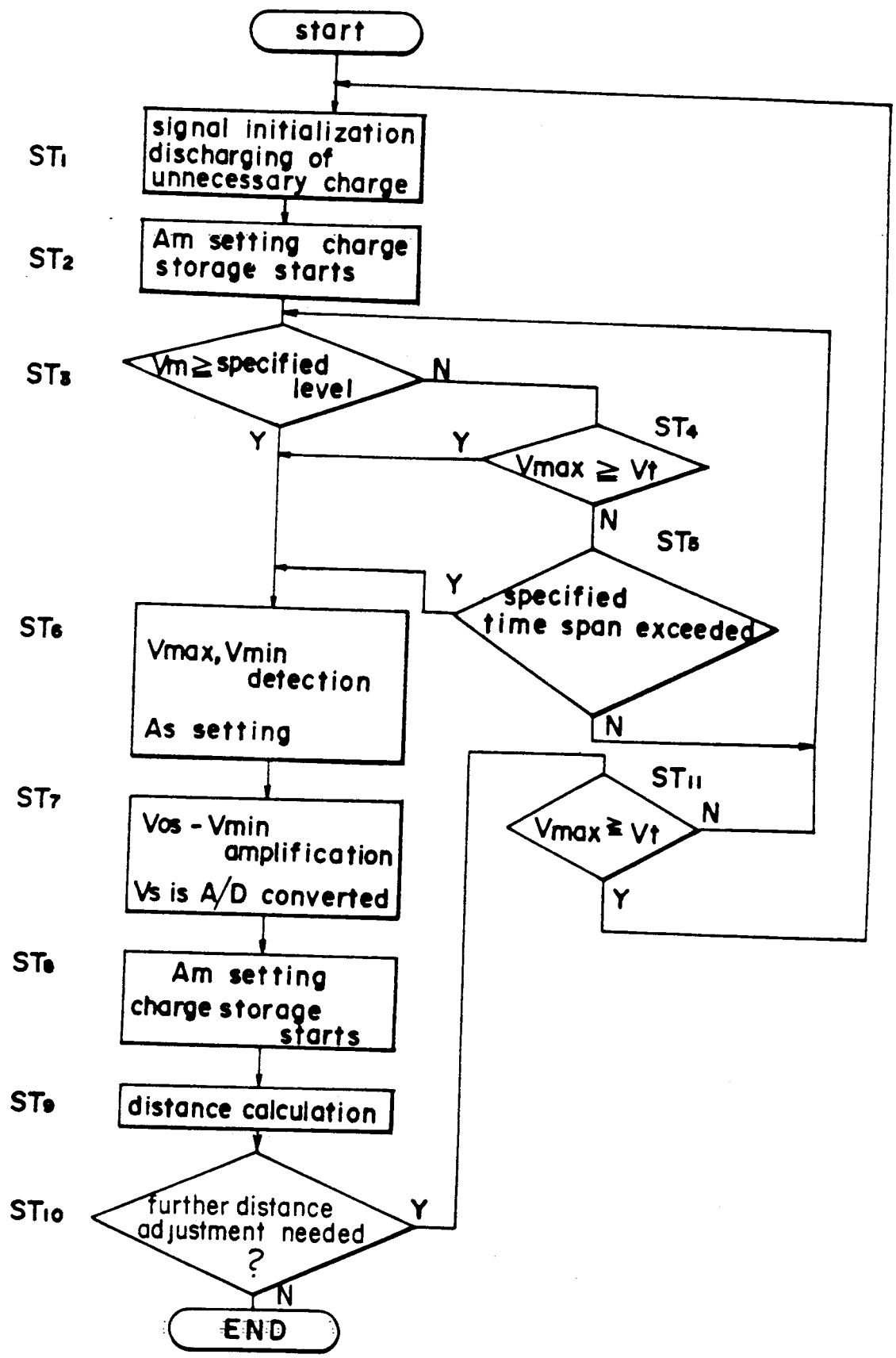
FIG. 13 is a flowchart illustrating a manner in which the control apparatus shown by FIG. 8 functions with the microcomputer.

FIG. 13 is a flowchart illustrating how the control apparatus of FIG. 8 functions with microcomputer 60. At step $ST_1$ signals are initialized and any unwanted charge (e.g., in shift register 24) is cleared out. Then at step $ST_2$ the gain $A_m$ is selected and charge accumulation of sensor array 21 is initiated. At step $ST_3$ whether the contrast monitoring output signal $V_m$ (more specifically, as processed by microcomputer 60) has reached the predetermined level is determined. If the predetermined level has been reached, at step $ST_6$ a new gain $A_s$ is selected. Then, at the step $ST_7$ the $-(V_{os}-V_{min})$ image signal is read out, amplified by $A_s$, and A/D converted. At step $ST_8$ sensor array 21 is reset and a fresh image begins charging array 21. Monitoring gain is reset to $A_m$. A distance calculation is made by the microcomputer at step $ST_9$ based on the data from step $ST_7$, after which an adjusting lens movement can be computed.

Next at step $ST_{10}$ whether the distance should be further adjusted is determined. If further adjustment is needed, at step $ST_{11}$ a determination is made whether the $V_{max}$ signal has reached or exceeded its saturation threshold voltage $V_t$. If it has, the routine returns to the initial step $ST_1$ to obtain a fresh image for sensor array 21. The unnecessary charge in array 21 is rapidly discharged and then the above-mentioned loop is followed again. If instead at step $ST_{11}$ the saturation threshold voltage $V_t$ has not yet been reached, the routine returns jumps to step $ST_3$ at which the level of output signal $V_m$ is determined, and the subsequent steps are followed again.

Suppose at step $ST_3$ signal $V_m$ has not yet reached the predetermined level but at step $ST_4$ the $V_{max}$ signal has reached the saturation threshold voltage $V_t$. In such case, the monitoring gain $A_m$ is readjusted based on the value reached by $V_m$, charge accumulation is stopped, and the routine proceeds to the signal gain $A_s$ setting step $ST_6$.

Figure 14:
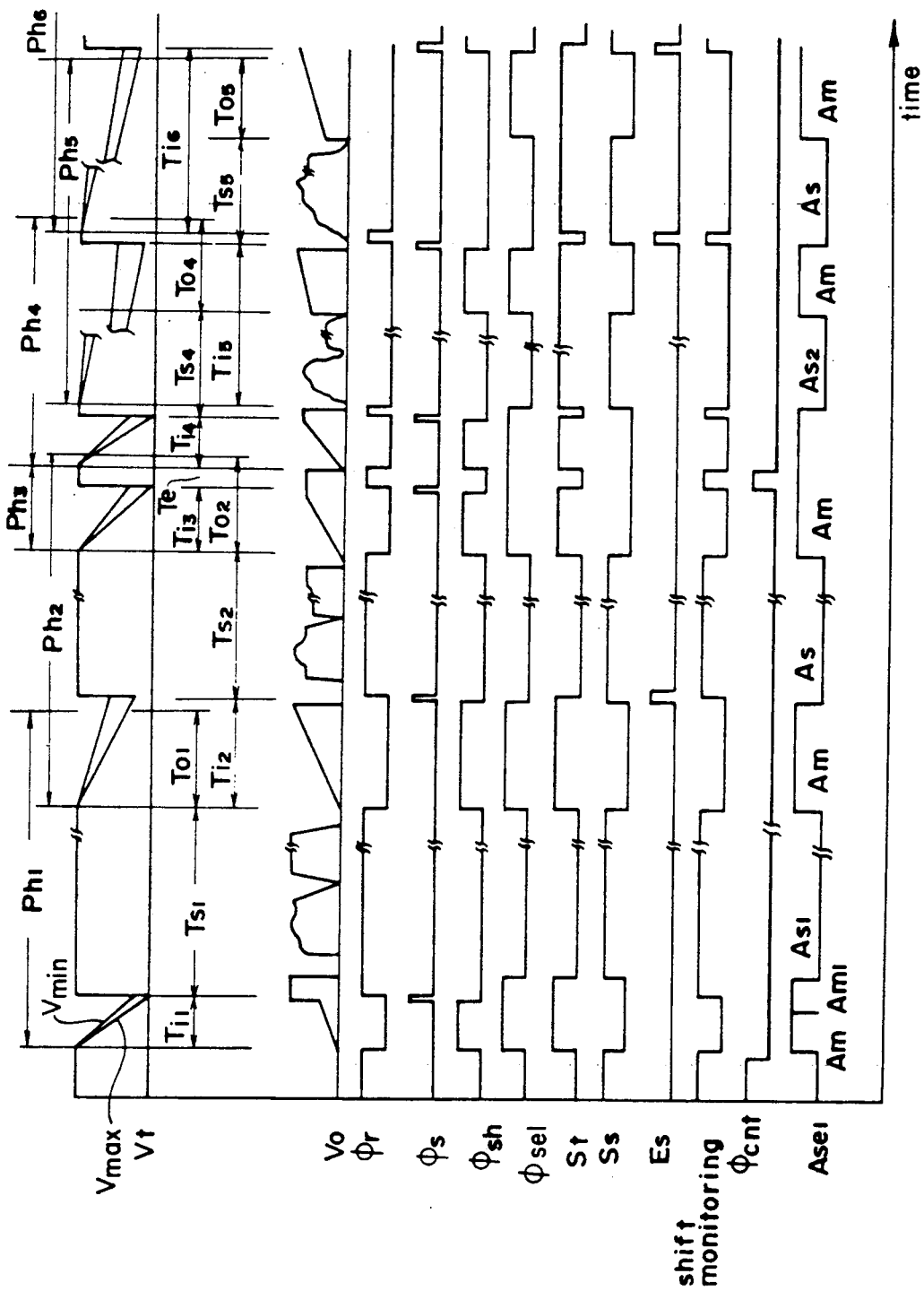
FIG. 14 is a timing chart illustrating the charge accumulation time of the sensor array by way of various examples.

Suppose instead that at step $ST_5$ the specified time interval has lapsed but the value of the processed output signal $V_m$ has not yet reached the predetermined level. The monitoring gain $A_m$ is readjusted, charge accumulation is forcibly terminated, and the routine jumps to the step $ST_6$ to set signal gain $A_s$. Thereafter, amplification of the $-(V_{os}-V_{min})$ image signal and A/D conversion of the output signal $V_s$ occur. 7. Timing Chart Description FIG. 14 is a timing chart illustrating the charge accumulation time of the sensor array 21 for various examples of image illumination. Each example starts its charge accumulation at a different time point.

Referring to FIG. 14, during a first phase $Ph_1$, charge accumulation stops when the $V_{max}$ signal reaches the saturation threshold voltage $V_t$. The time interval $T_{i1}$ represents the charge accumulation time. Interval $T_{s1}$ represents the time for signal fetching from CCD shift register 24, and interval $T_{o1}$ represents the data processing time for calculating the degree of focus and computing an adjusting lens movement. When $V_{max}$ reaches $V_t$, then $A_m$ is readjusted to $A_{m1}$.

During a second phase $Ph_2$, charge accumulation starts immediately after the signal fetching interval $T_{s1}$ has elapsed. As in phase $Ph_1$, the intervals $T_{i2}$, $T_{s2}$, and $T_{o2}$ respectively represent the charge accumulation time, signal fetching time, and data processing time.

During a third phase $Ph_3$, charge accumulation starts immediately after the signal fetching interval $T_{s2}$ has elapsed. When the $V_{max}$ signal reaches the saturation threshold voltage $V_t$ during the data processing time $T_{o2}$ of the second phase, the charge transferred to shift register 24 is rapidly cleared out during an interval Te.

Then a new charge accumulation interval $T_{i4}$ in image array 21 begins a subsequent phase $Ph_4$.

During $Ph_4$, a new gain $-A_{s2}$ for the $(V_{os}-V_{min})$ output signal is selected on the basis of the value of the monitoring output signal $V_o=V_m$ at the moment of shift from monitoring to fetch and readout.

During phase $Ph_5$, the charge accumulation interval $T_{i5}$ is initiated after the preceding charge accumulation interval $T_{i4}$ has elapsed. The charge accumulation interval $T_{i5}$ is completed during the data processing time $T_{o4}$ of the previous phase. Then the signal fetching time $T_{s5}$ is immediately initiated.

During phase $Ph_6$, the charge accumulation interval $T_{i6}$ exceeds the specified time interval. Therefore, shift signal $E_s$ is forcibly applied to shift pulse control circuit 44 to cause fetch and readout.

As will be appreciated from the above explanation, the charge accumulation start point varies considerably with the particular charge accumulation amount. Such start point will be discussed with reference to FIGS. 15A-15D and 16A and 16B. The start point of the next phase is selected depending on the duration of the charge accumulation time $T_i$ of the current phase so that the signal fetching in the next phase cannot begin until the data processing of the current phase is completed.

More specifically, the time interval $T_s$ needed to fetch the image data signal $V_{os}$ from CCD shift register 24 and the processing interval $T_o$ for the data signal $V_{os}$ are fixed times previously selected in connection with the particular construction of the apparatus. Therefore, these times $T_s$, $T_o$ can be compared by the microcomputer 60 with the current charge accumulation time $T_i$ to determine the next start point.

FIG. 15A corresponds to the long charge time condition of $T_i>T_s+T_o$. Therefore, to save time the charge accumulation for the following phase starts immediately after the charge accumulation on the preceding phase has been completed. As illustrated, the signal fetching $T_s$ on the following phase will start only after the processing time $T_o$ on the preceding phase has elapsed.

FIG. 15B corresponds to the intermediate charge time condition of $T_s+T_o>T_i>T_o$. Therefore, to assure that the data processing of the previous phase finishes before the fetch of the next phase is needed, the charge accumulation on the following phase starts only after the signal fetching time $T_s$ of the preceding phase has elapsed.

FIG. 15C corresponds to the short charge time condition that the charge accumulation time $T_i$ is short compared to the processing time, i.e. that $T_i>T_o$. Under such condition, the charge accumulation of the following phase is not allowed to start until the data processing time $T_o$ of the preceding phase has elapsed.

As shown in FIG. 15D, the processing interval $T_o$ can be subdivided into an interval $T_{o1}$ during which the output signal $V_s=-A_s(V_{os}-V_{min})$ is A/D converted and stored into random access memory (RAM) for signal processing and an interval $T_{o2}$ during which the correcting lens movement is calculated. More specifically, in accordance with the so-called "phase difference detection" technique, the accumulated charge signal on sensor array 21 for the image sensor pixel series $a_0, a_1 \ldots a_m$ (i.e., primary image area) is compared with the accumulated charge signal for the image sensor pixel series $b_0, b_1 \ldots b_{m+n}$ (i.e., reference image area), and the relative displacement of the object images on these two image areas is determined by calculations of the cross-correlation formula:

$$S_x = \sum_{t=0}^{n} \{a_t - b_{x+t}\} \qquad (4)$$

where $x = 0, 1, 2, \ldots m$

Referring to the above formula, $S_0$ through $S_m$ are successively calculated with respect to displacements $x=0$ through $x=m$. The value of $x=x_d$ for which $S_x$ takes its minimum value indicates the relative displacement for which the image on the reference area matches the image on the primary area.

Thus, the processing time $T_o$ can be subdivided into the time $T_{o1}$ during which the signal is processed to determine the $S_x$ values and the time $T_{o2}$ during which an adjusting lens movement is calculated based on the computed relative image displacement $x_d$. Since the signal fetching for the following phase may only conflict with the signal processing for the current phase with respect to $S_x$ (i.e., during the time $T_{o1}$), if desired for further speedup the signal fetching of the following phase can start immediately after the signal processing time $T_{o1}$ of the preceding phase has been completed.

Accordingly, in FIGS. 15A–15D instead of referring to the entire interval $T_o$, we can take it that FIG. 15A corresponds to the condition of $T_i > T_s + T_{o1}$, FIG. 15B corresponds to the condition of $T_s + T_{o1} > T_i > T_{o1}$, and FIG. 15C corresponds to the condition of $T_i < T_{o1}$.

Figure 16A:
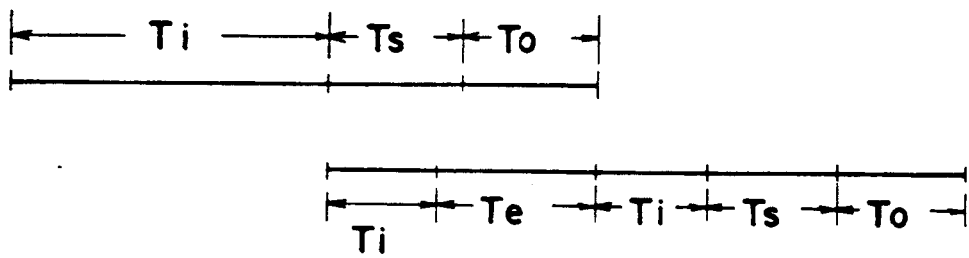
Figure 16B:
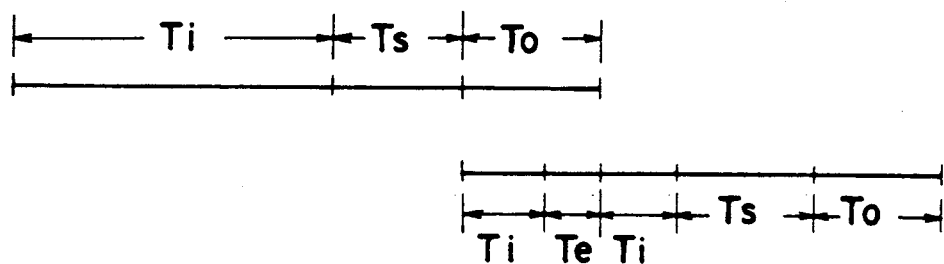
Figure 17:
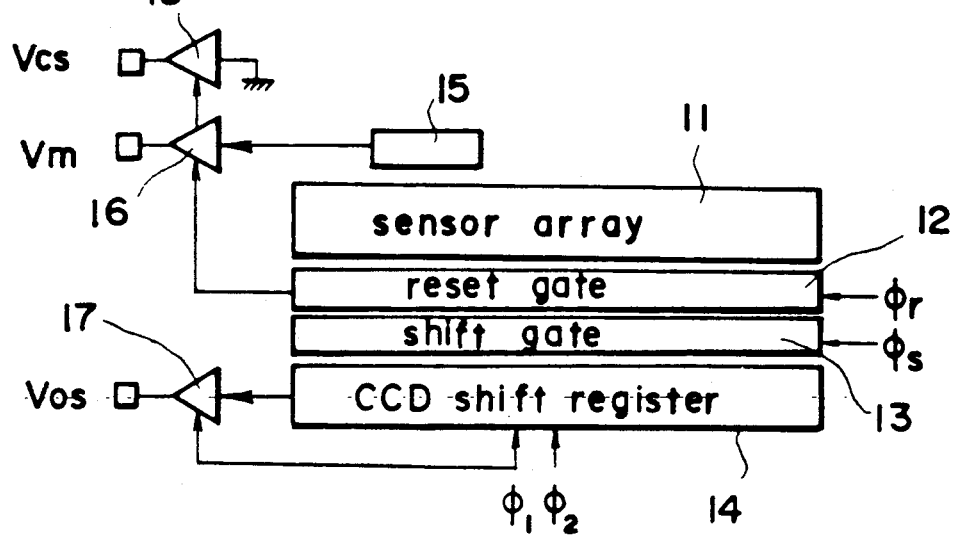
FIG. 17 is a block diagram of a prior art image sensor and brightness monitoring means.
Figure 18A:
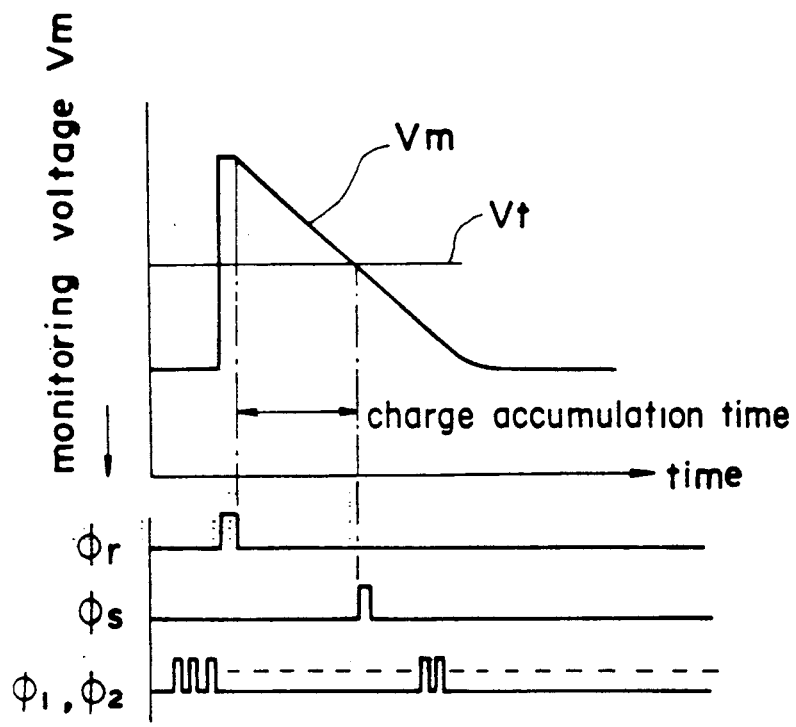
FIGS. 18A and 18B are a waveform diagram illustrating how a brightness monitoring voltage $V_m$ operates to control the charge accumulation time of the image sensor of FIG. 17.
Figure 18B:
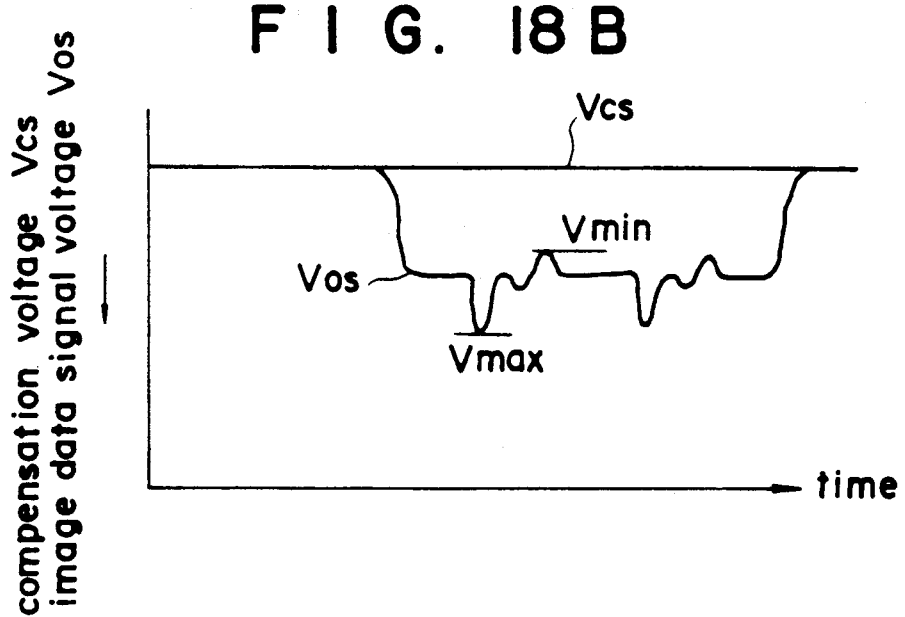
Figure 20:
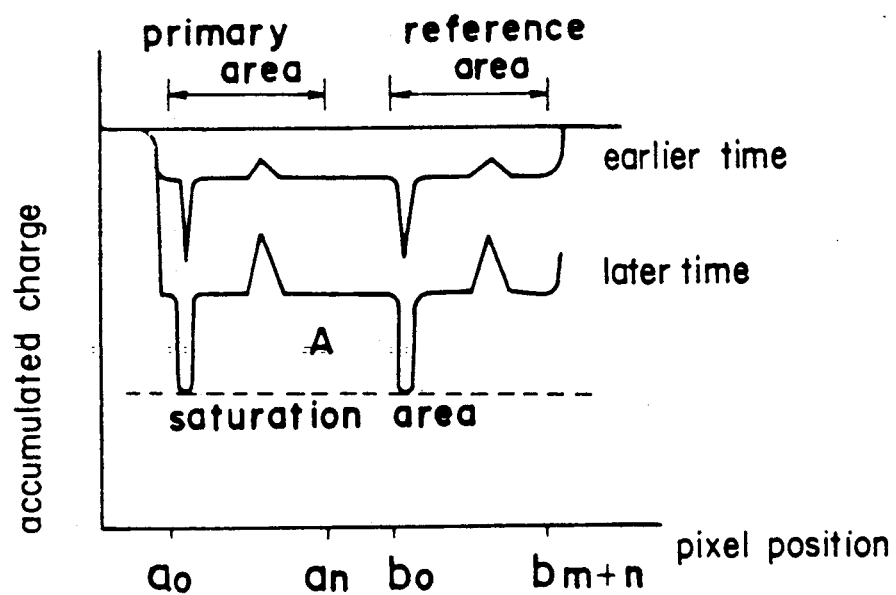
FIG. 20 is a diagram illustrating the charge accumulation amount in the sensor array of FIG. 17 by pixel position at two different times.

In FIGS. 16A and 16B show the charge accumulation start point for the case in which during the second phase the accumulated charge in image array 21 is rapidly discharged instead of being fetched. When the brightness of the object to be photographed suddenly increases during monitoring so the accumulated charge saturates, comparator 43 inverts, which causes charge accumulation to stop suddenly. In such a case, if charge clearing does not take place at $T_e$, it is feared that the following phase might erroneously start signal fetching during the current phase's signal fetching interval $T_s$ (FIG. 16A) or signal processing interval $T_o$ (FIG. 16B). To avoid this, the accumulated charge in array 21 of the following phase is rapidly cleared during an interval $T_e$, and charge accumulation in the following phase is reinitiated immediately after the signal processing interval $T_o$ of the preceding phase has been completed. In FIGS. 16A and 16B also, the total data processing time $T_o$ may be subdivided into $T_{o1}$ and $T_{o2}$, and the reinitiation of charge accumulation for the following phase begun just after the current phase completes interval $T_{o1}$.

Although the present invention has been described hereinabove in reference with an image sensor 25 which uses a CCD element, it is obvious that the present invention is also applicable for other types of image sensors, such as a MOS sensor.

We claim:

1. A control apparatus for an image sensor having an array of pixels, comprising light detector means for deriving instantaneous maximum and minimum light detection signals from respective amounts of stored charge at pixels upon which the most intense and weakest components of the whole incident light upon said image sensor are respectively incident, first stopping control means for stopping a charge accumulation of said image sensor based on a signal representing a difference between said instantaneous maximum and minimum light detection signals, and second stopping control means responsive to said instantaneous maximum light detection signal increasing close to saturation for stopping further charge accumulation of said image sensor prior to said first stopping control means.

2. A control apparatus for an image sensor having an array of pixels, comprising light detector means adapted to derive instantaneous maximum and minimum light detection signals from respective amounts of stored charge at pixels upon which the most intense and weakest components of the whole incident light upon said image sensor are respectively incident, first stopping control means for stopping charge accumulation of said image sensor based on a signal representing a difference between said instantaneous maximum and minimum light detection signals, and second stopping control means responsive to said instantaneous maximum light detection signal increasing close to saturation to stop the further charge accumulation of said image sensor prior to said first stopping control means, and initiation control means active if charge accumulation is stopped by said second stopping control means during a period of the preceding image data signal fetching or operational processing of this data signal, for causing the image sensor to discharge the accumulated charge and then to initiate a new charge accumulation after the preceding operational processing period has elapsed.

3. A control apparatus for an image sensor having an array of pixels and means for fetching an image signal from the pixels, said control apparatus comprising light detector means for deriving a minimum light detection signal from an amount of accumulated charge at a pixel upon which the weakest component of the whole incident light upon said image sensor is incident, and signal output means for deriving a signal representing a difference between the image data signal and said minimum light detection signal to generate an output signal for data processing.

4. A control apparatus for an image sensor having an array of pixels responsive to light during a charge accumulation interval, comprising light detector means for deriving instantaneous maximum and minimum light detection signals from respective amounts of stored charge at pixels upon which the most intense and weakest components of the whole incident light upon said image sensor are responsively incident, and control means active, if a difference signal representing a difference between said instantaneous maximum and minimum light detection signals reaches a predetermined level before a first specified time interval elapses, for terminating the charge accumulation interval as soon as said predetermined level has been reached, and otherwise for terminating said charge accumulation interval when the first specified time interval elapses if said difference signal then enables the image sensor to discriminate an image, but otherwise when a second specified time interval following the first specified time interval elapses.

5. A control system for an image sensor that has
an array of pixels, each pixel generating during an accumulation interval a corresponding instantaneous pixel signal cumulatively responsive to the light the pixel has received from an incident image, and fetching means for composing an image signal from the values attained by the array's various instantaneous pixel signals at the end of the accumulation interval;

said control system comprising:

drive control means coupled to the array for defining the accumulation interval; and contrast detector means coupled to the array for deriving an instantaneous image contrast signal from the instantaneous pixel signals.

6. The control system of claim 5 wherein the constrast detector means is coupled in parallel to each pixel of the array.

7. The control system of claim 5 further comprising:
control means responsive to the instantaneous image contrast signal for regulating the drive control means to adjust the accumulation interval so the image signal composed at the end of the accumulation interval has good contrast.

8. The control system of claim 7 wherein the control means comprises a microcomputer.

9. The control system of claim 5 wherein the contrast detector means comprises:

detector means for detecting an instantaneous maximum pixel signal and an instantaneous minimum pixel signal from among the various instantaneous pixel signals; and monitoring difference means for deriving the instantaneous image contrast signal from the difference between the instantaneous maximum and minimum pixel signals.

10. The control system of claim 9 further comprising:
control means responsive to the instantaneous image contrast signal for regulating the drive control means to adjust the accumulation interval so the image signal composed at the end of the accumulation interval has good contrast.

11. The control system of claim 9 wherein the monitoring difference means includes a monitoring amplifier means for amplifying the difference between the instantaneous maximum and minimum pixel signals by a monitoring gain to produce the instantaneous image contrast signal.

12. The control system of claim 11 further comprising control means:

responsive to the instantaneous image contrast signal for regulating the drive control means to adjust the accumulation interval so the image signal composed at the end of the accumulation interval has good contrast;

responsive to a value $V_M$ attained by the instantaneous image contrast signal at the end of the accumulation interval for adjusting the monitoring gain of the monitoring difference means as needed to improve the amplitude of the value $V_M$.

13. The control system of claim 12 further comprising an analog-to-digital (A/D) converter for producing a digitalized instantaneous image contrast signal from the instantaneous image contrast signal, for use by a digital portion of the control means; and wherein the control means is responsive to the value $V_M$ attained by the instantaneous image contrast signal at the end of the accumulation interval for adjusting the monitoring gain of the monitoring difference means as needed to improve the accuracy attained by the A/D converter.

14. The control system of claim 11 further comprising control means responsive to the instantaneous image contrast signal for regulating the drive control means to adjust the accumulation interval so the image signal composed at the end of the accumulation interval has good contrast;

means for detecting the value $V_{MIN}$ of the instantaneous minimum pixel signal at the end of the accumulation interval; and video amplifier means for amplifying the difference between the image signal and the value $V_{MIN}$ by a video gain to produce a video contrast signal.

15. The control system of claim 14 wherein the monitoring and video amplifier means are provided by a common amplifier.

16. The control system claim 15 further comprising switch means for adjusting the common amplifier means between a first state providing the monitoring amplifier means and a second state providing the video amplifier means.

17. The control system of claim 14 wherein the control means is responsive to a value $V_M$ of the instantaneous image contrast signal at the end of the accumulation interval for adjusting the video gain of the video amplifier means.

18. The control system of claim 5 further comprising control means responsive to the instantaneous image contrast signal for regulating the drive control means to adjust the accumulation interval so the image signal composed at the end of the accumulation interval has good contrast;

detector means for detecting a minimum value $V_{MIN}$ from among the various instantaneous pixel signals at the end of the accumulation interval; and video difference means for deriving a video contrast signal from the difference between the image signal and the value $V_{MIN}$.

19. The control system of claim 18 wherein the video difference means comprises a video amplifier means for amplifying the difference between the image signal and the value $V_{MIN}$ by a video gain to produce the video contrast signal.

20. The control system of claim 19 wherein the control means is responsive to a value $V_M$ of the instantaneous image contrast signal at the end of the accumulation interval for adjusting the video gain of the video amplifier means.

21. A control system for efficiently and cooperatively cycling an image sensor and its control means through a series of overlapping nonuniform frame processing phases;

the image sensor comprising an array of light-detecting pixels and fetching means responsive to the pixels for composing an image signal, and the control means comprising means for data processing the image signal; and each frame processing phase comprising in succession an accumulation interval $T_i$ for the array of pixels which varies from phase to phase, a predetermined fetching interval $T_s$ for the fetching means of the image sensor, and an estimable data processing interval $T_o$ for the control means;

the control system comprising control means for initiating an accumulation interval $T_i$ for a next phase promptly after
(a) the charge accumulation interval $T_i$ of the current phase has elapsed if $T_i > T_s + T_o$, or
(b) the fetching interval $T_s$ of the current phase has elapsed if $T_o < T_i < T_s + T_o$; or
(c) the operational processing interval $T_o$ has elapsed if $T_i < T_o$.

* * * * *